US012641035B2

(12) United States Patent
Zhang et al.

(10) Patent No.: US 12,641,035 B2
(45) Date of Patent: May 26, 2026

(54) NODE FOR RUNNING CONTAINER GROUP, AND CONTAINER GROUP MANAGEMENT SYSTEM AND METHOD

(71) Applicant: HUAWEI CLOUD COMPUTING TECHNOLOGIES CO., LTD., Guizhou (CN)

(72) Inventors: Wei Zhang, Beijing (CN); Yu Jiang, Dongguan (CN); Jian Huang, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 81 days.

(21) Appl. No.: 18/435,772

(22) Filed: Feb. 7, 2024

(65) Prior Publication Data

US 2024/0250918 A1 Jul. 25, 2024

Related U.S. Application Data

(63) Continuation of application No. PCT/CN2022/110895, filed on Aug. 8, 2022.

(30) Foreign Application Priority Data

Aug. 9, 2021 (CN) .......................... 202110910594.X

(51) Int. Cl.
| | |
|---|---|
| *G06F 15/173* | (2006.01) |
| *H04L 47/20* | (2022.01) |
| *H04L 47/80* | (2022.01) |

(52) U.S. Cl.
CPC ............ *H04L 47/803* (2013.01); *H04L 47/20* (2013.01)

(58) Field of Classification Search
CPC .............................. H04L 47/803; H04L 47/20
See application file for complete search history.

(56) References Cited

U.S. PATENT DOCUMENTS

2021/0019194 A1 1/2021 Bahl et al.

*Primary Examiner* — Joseph R Maniwang
(74) *Attorney, Agent, or Firm* — WOMBLE BOND DICKINSON (US) LLP

(57) ABSTRACT

This application relates to the field of data processing technologies, and in particular, to a node for running a container group, and a container group management system and method. A connection control module, a sidecar cluster, and a first service container group are run on the node. The sidecar cluster includes at least two sidecars. The connection control module is configured to: receive a sidecar allocation policy sent by a console connected to the node, select a first sidecar from the sidecar cluster according to the sidecar allocation policy, and forward, to the first sidecar, a data packet sent by the first service container group. The first sidecar is configured to perform traffic management on the data packet sent by the first service container group. In this application, a sidecar may be selected for a service container group, to perform better traffic management on the service container group.

20 Claims, 12 Drawing Sheets

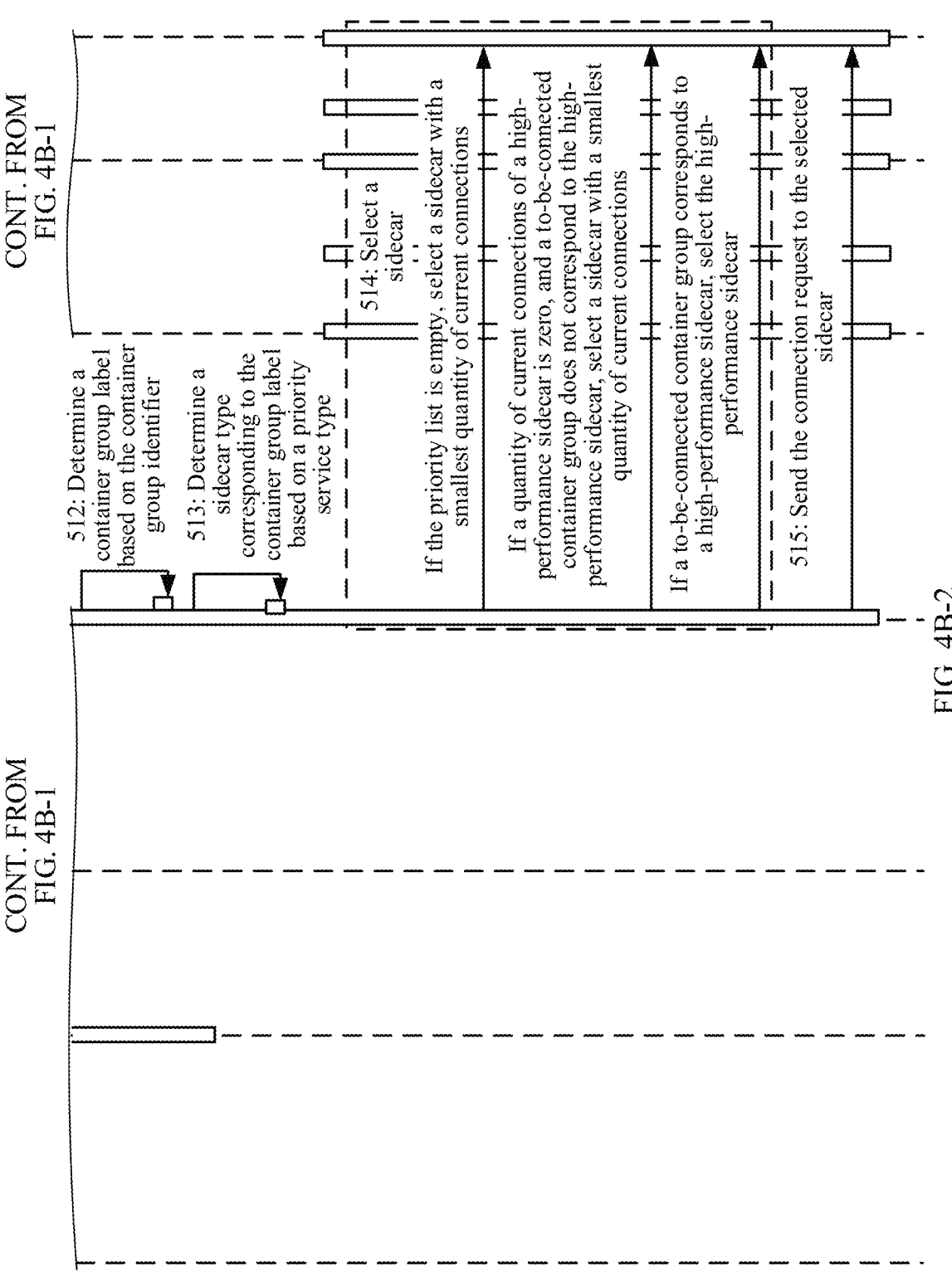

CONT. FROM FIG. 4B-1

CONT. FROM FIG. 4B-1

512: Determine a container group label based on the container group identifier

513: Determine a sidecar type corresponding to the container group label based on a priority service type 514: Select a sidecar If the priority list is empty, select a sidecar with a smallest quantity of current connections If a quantity of current connections of a high-performance sidecar is zero, and a to-be-connected container group does not correspond to the high-performance sidecar, select a sidecar with a smallest quantity of current connections If a to-be-connected container group corresponds to a high-performance sidecar, select the high-performance sidecar 515: Send the connection request to the selected sidecar

FIG. 4B-2

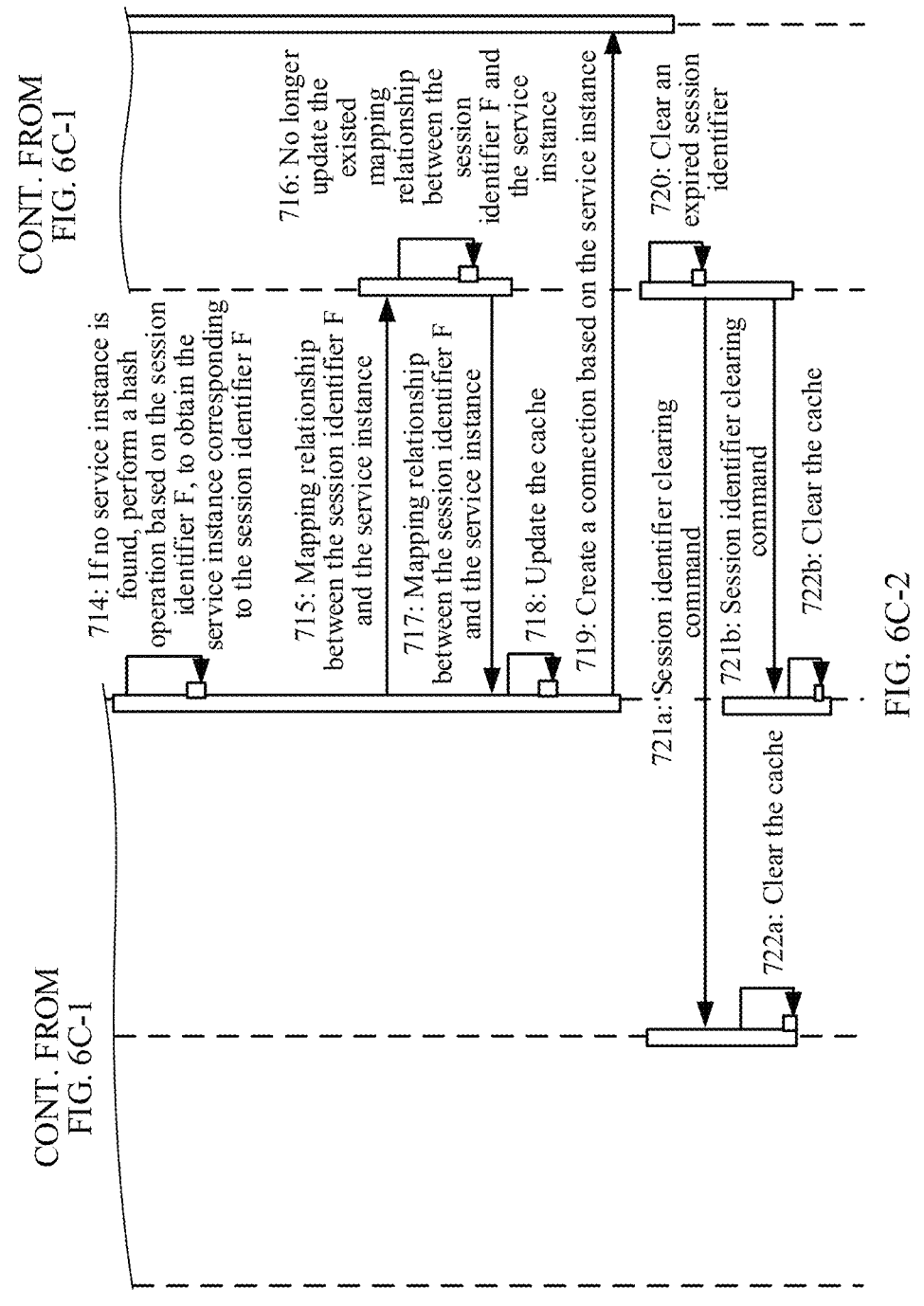

CONT. FROM
FIG. 6C-1

CONT. FROM
FIG. 6C-1

714: If no service instance is found, perform a hash operation based on the session identifier F, to obtain the service instance corresponding to the session identifier F 715: Mapping relationship between the session identifier F and the service instance 716: No longer update the existed mapping relationship between the session identifier F and the service instance 717: Mapping relationship between the session identifier F and the service instance 718: Update the cache 719: Create a connection based on the service instance 720: Clear an expired session identifier 721a: Session identifier clearing command 721b: Session identifier clearing command 722a: Clear the cache 722b: Clear the cache

FIG. 6C-2

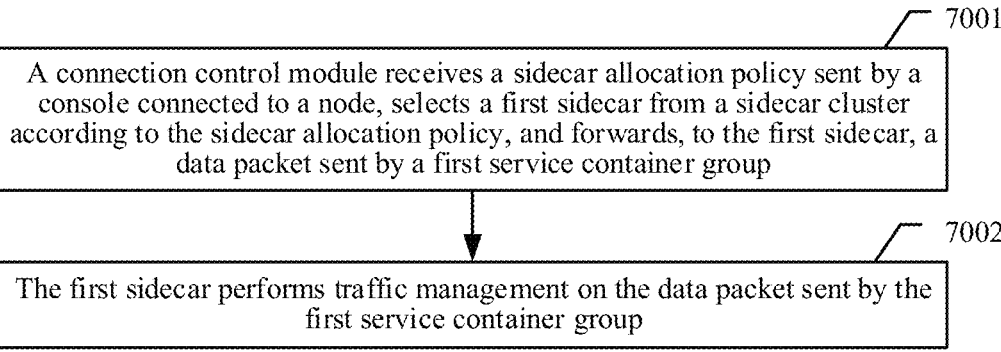

A connection control module receives a sidecar allocation policy sent by a console connected to a node, selects a first sidecar from a sidecar cluster according to the sidecar allocation policy, and forwards, to the first sidecar, a data packet sent by a first service container group The first sidecar performs traffic management on the data packet sent by the first service container group

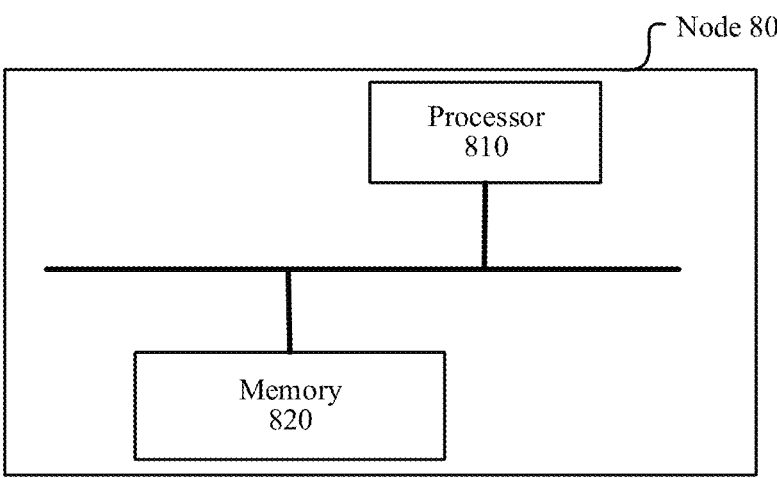

Node 800

Processor
810

Memory
820

FIG. 8

NODE FOR RUNNING CONTAINER GROUP, AND CONTAINER GROUP MANAGEMENT SYSTEM AND METHOD

CROSS-REFERENCE TO RELATED APPLICATIONS

This is a continuation of International Patent Application PCT/CN2022/110895, filed on Aug. 8, 2022, which claims priority to Chinese Patent Application No. 202110910594.X, filed on Aug. 9, 2021. The disclosures of the aforementioned applications are hereby incorporated by reference in their entireties.

TECHNICAL FIELD

This application relates to the field of cloud computing, and in particular, to a node for running a container group, and a container group management system and method.

BACKGROUND

In a service mesh technology, non-functional traffic-oriented service governance logic in a distributed application of a microservice architecture is removed from a service process to a sidecar container, and inter-service connection, securing, flow control, gray release, and observation capabilities are provided in a non-intrusive manner, to implement lightweight services and infrastructure-based service governance. In addition, the service mesh technology is an application network technology based on a conventional internet protocol (IP) network. Therefore, in the service mesh technology, discovery and routing between services are no longer performed directly based on IP addresses, but are performed based on metadata information (including but not limited to service names, versions, and the like) of the services.

With development of user requirements, a scale and invoking complexity of microservices increase rapidly. How to efficiently govern the microservices and reduce operation and maintenance costs in a continuous running phase is an important issue in evolution of the service mesh technology.

SUMMARY

Embodiments of this application provide a node for running a container group, and a container group management system and method, to select a sidecar for a service container group, to perform better traffic management on the service container group.

According to a first aspect, an embodiment of this application provides a node for running a container group. A connection control module, a sidecar cluster, and a first service container group are run on the node. The sidecar cluster includes at least two sidecars. The connection control module is configured to: receive a sidecar allocation policy sent by a console connected to the node, select a first sidecar from the sidecar cluster according to the sidecar allocation policy, and forward, to the first sidecar, a data packet sent by the first service container group. The first sidecar is configured to perform traffic management on the data packet sent by the first service container group.

In this solution, the connection control module may select a sidecar for the first service container group from the at least two sidecars according to the sidecar allocation policy sent by the console, and perform, by using the selected sidecar, traffic management on the data packet sent by the first service container group, so that the first service container group can be flexibly managed, and better traffic management can be performed on the first service container group, thereby ensuring a high availability capability of a service of the first service container group.

In a possible implementation, the node further includes a second service container group. The connection control module is further configured to: select a second sidecar from the sidecar cluster according to the sidecar allocation policy, and forward, to the second sidecar, a data packet sent by the second service container group. The second sidecar is configured to perform traffic management on the data packet sent by the second service container group. The second sidecar and the first sidecar may be a same sidecar, or may be different sidecars.

In other words, the connection control module may select a sidecar for the second service container group from the at least two sidecars according to the sidecar allocation policy, and perform, by using the selected sidecar, traffic management on the data packet sent by the second service container group, so that the second service container group can be flexibly managed, and better traffic management can be performed on the second service container group, thereby ensuring a high availability capability of a service of the second service container group.

In a possible implementation, a specification of a hardware resource allocated to the first sidecar is higher than that of a hardware resource allocated to the second sidecar, the sidecar allocation policy includes a first policy, and the first policy indicates the first service container group to preferentially use the first sidecar. The connection control module is configured to select the first sidecar from the sidecar cluster according to the first policy.

In other words, in this implementation, hardware resources with different hardware resource specifications may be set. When the sidecar allocation policy indicates the first service container group to preferentially use a sidecar with a high hardware resource specification, the sidecar with the high hardware resource specification is used to perform traffic management on the data packet sent by the first service container group, to ensure quality of service of a service of the first service container group.

In a possible implementation, the node further includes the second service container group, the sidecar allocation policy further includes a second policy, and the second policy indicates that a quantity of objects served by the first sidecar does not exceed an upper limit value. The connection control module is further configured to: determine the quantity of objects served by the first sidecar, and forward, to the first sidecar when the quantity of objects served by the first sidecar does not exceed the upper limit value, the data packet sent by the second service container group. The first sidecar is further configured to simultaneously perform traffic management on the data packet sent by the first service container group and the data packet sent by the second service container group.

In other words, in this implementation, an upper limit value of a quantity of objects served by a sidecar may be set. When a quantity of objects currently served by the sidecar does not exceed the upper limit value, a data packet is continuously allocated to the sidecar, so that the sidecar performs traffic management on the data packet, to avoid overload of the sidecar and improve resource utilization of the sidecar.

In a possible implementation, the connection control module is configured to: after the first sidecar is faulty, select a third sidecar from the sidecar cluster, or notify the console to create the third sidecar in the node, and forward, to the third sidecar, another data packet sent by the first service container group. The third sidecar is configured to perform traffic management on the another data packet sent by the first service container group.

In other words, in this implementation, after the first sidecar is faulty, the third sidecar may be reselected for the first service container group, and the third sidecar may continue to perform traffic management on the data packet sent by the first service container group, to ensure a high availability capability of a service of the first service container group.

In a possible implementation, the third sidecar is a new version to which a function is upgraded based on the first sidecar, or the third sidecar is a replication version of the first sidecar.

In other words, in this implementation, after the first sidecar is faulty, a sidecar having a same function as the first sidecar may be selected for the first service container group, or a sidecar having a higher level than the first sidecar may be selected, to continue to perform traffic management on the data packet sent by the first service container group. In this way, a high availability capability of a service of the first service container group is ensured.

In a possible implementation, the first sidecar is configured to send the data packet to a back-end container group after performing traffic management on the data packet sent by the first service container group.

In other words, in this implementation, the first sidecar may send, to the back-end container group, the data packet on which traffic management is performed, to invoke a service of the back-end container group or provide a service for the back-end container group.

In a possible implementation, the first sidecar is further configured to: generate a session identifier, and send the session identifier to the first service container group and the connection control module. The connection control module is configured to record a correspondence between the session identifier and the back-end container group. The third sidecar is configured to: obtain the session identifier from the first service container group, determine, based on the session identifier, the back-end container group in the correspondence recorded by the connection control module, and send the another data packet to the back-end container group after performing traffic management on the another data packet sent by the first service container group.

In other words, in this implementation, the connection control module may record the correspondence between the session identifier generated by the first sidecar and the back-end container group. The third sidecar may perform, based on the correspondence, traffic management on the another data packet sent by the first service container group, and then send the another data packet to the back-end container group, to avoid a problem that different data packets sent by a same container group are sent by different sidecars to different back-end container groups.

In a possible implementation, the sidecar allocation policy includes a third policy, and the third policy indicates that a sidecar in the sidecar cluster is preferentially used when a quantity of objects served by the sidecar is 0. The connection control module is further configured to: determine a quantity of objects served by the first sidecar, and forward, to the first sidecar when the quantity of objects served by the first sidecar is 0, the data packet sent by the first service container group.

In a possible implementation, the connection control module is further configured to: monitor a working status of each sidecar in the sidecar cluster, and when finding that there is an offline sidecar, send information about the offline sidecar to the console.

In other words, in this implementation, the offline sidecar may be fed back to the console, so that the console updates a running sidecar, and formulates a sidecar allocation policy based on this, to effectively manage the container group.

In a possible implementation, traffic management includes traffic control, traffic securing, and traffic observation.

In a possible implementation, the node is a virtual machine, a computer, or a bare metal server.

According to a second aspect, an embodiment of this application provides a container group management system, including a console and the node provided in the first aspect.

According to a third aspect, an embodiment of this application provides a method for managing a container group in a node. A connection control module, a sidecar cluster, and a first service container group are run on the node. The sidecar cluster includes at least two sidecars. The method includes: The connection control module receives a sidecar allocation policy sent by a console connected to the node, selects a first sidecar from the sidecar cluster according to the sidecar allocation policy, and forwards, to the first sidecar, a data packet sent by the first service container group; and the first sidecar performs traffic management on the data packet sent by the first service container group.

In a possible implementation, a second service container group is further run on the node. The method further includes: The connection control module selects a second sidecar from the sidecar cluster according to the sidecar allocation policy, and forwards, to the second sidecar, a data packet sent by the second service container group; and the second sidecar performs traffic management on the data packet sent by the second service container group.

In a possible implementation, a specification of a hardware resource allocated to the first sidecar is higher than that of a hardware resource allocated to the second sidecar, the sidecar allocation policy includes a first policy, and the first policy indicates the first service container group to preferentially use the first sidecar. The selecting a first sidecar from the sidecar cluster according to the sidecar allocation policy includes: selecting the first sidecar from the sidecar cluster according to the first policy.

In a possible implementation, the second service container group is further run on the node, the sidecar allocation policy further includes a second policy, and the second policy indicates that a quantity of objects served by the first sidecar does not exceed an upper limit value. The method further includes: The connection control module determines the quantity of objects served by the first sidecar, and forwards, to the first sidecar when the quantity does not exceed the upper limit value, the data packet sent by the second service container group; and the first sidecar simultaneously performs traffic management on the data packet sent by the first service container group and the data packet sent by the second service container group.

In a possible implementation, the method further includes: After the first sidecar is faulty, the connection control module selects a third sidecar from the sidecar cluster, or notifies the console to create the third sidecar in the node, and forwards, to the third sidecar, another data packet sent by the first service container group; and the third sidecar performs traffic management on the another data packet sent by the first service container group.

5

In a possible implementation, the third sidecar is a new version to which a function is upgraded based on the first sidecar, or the third sidecar is a replication version of the first sidecar.

In a possible implementation, the method further includes: The first sidecar sends the data packet to a back-end container group after performing traffic management on the data packet sent by the first service container group.

In a possible implementation, the method further includes: The first sidecar generates a session identifier, and sends the session identifier to the first service container group and the connection control module; the connection control module records a correspondence between the session identifier and the back-end container group; and the third sidecar obtains the session identifier from the first service container group, determines, based on the session identifier, the back-end container group in the correspondence recorded by the connection control module, and sends the another data packet to the back-end container group after performing traffic management on the another data packet sent by the first service container group.

In a possible implementation, the sidecar allocation policy includes a third policy, and the third policy indicates that a sidecar in the sidecar cluster is preferentially used when a quantity of objects served by the sidecar is 0. The selecting a first sidecar from the sidecar cluster according to the sidecar allocation policy, and forwarding, to the first sidecar, a data packet sent by the first service container group includes: The connection control module determines a quantity of objects served by the first sidecar, and forwards, to the first sidecar when the quantity of objects served by the first sidecar is 0, the data packet sent by the first service container group.

In a possible implementation, the method further includes: The connection control module monitors a working status of each sidecar in the sidecar cluster, and when finding that there is an offline sidecar, sends information about the offline sidecar to the console.

In a possible implementation, traffic management includes traffic control, traffic securing, and traffic observation.

According to a fourth aspect, an embodiment of this application provides a node for running a container group, including a processor and a memory. The processor is configured to execute instructions stored in the memory, to perform the method provided in the second aspect.

According to a fifth aspect, an embodiment of this application provides a computer-readable storage medium, including computer program instructions. When the computer program instructions are executed by a computing device cluster, the computing device cluster performs the method provided in the first aspect.

According to a sixth aspect, an embodiment of this application provides a computer program product including instructions. When the instructions are run by a computing device cluster, the computing device cluster is enabled to perform the method provided in the first aspect.

According to the node for running the container group, and the container group management system and method that are provided in embodiments of this application, a sidecar may be selected for a service container group from at least two sidecars according to a sidecar allocation policy sent by a console, and the selected sidecar is used to perform traffic management on a data packet sent by the service container group, so that the service container group can be flexibly managed, and better traffic management can be performed on the service container group, thereby ensuring a high availability capability of a service of the service container group.

BRIEF DESCRIPTION OF DRAWINGS

FIG. 4B-1 and FIG. 4B-2 are a flowchart of a container group management method according to an embodiment of this application;

FIG. 6C-1 and FIG. 6C-2 are a flowchart of a container group management method according to an embodiment of this application;

FIG. 7 is a flowchart of a container group management method according to an embodiment of this application; and FIG. 8 is a schematic block diagram of a node according to an embodiment of this application.

DESCRIPTION OF EMBODIMENTS

Figure 1:
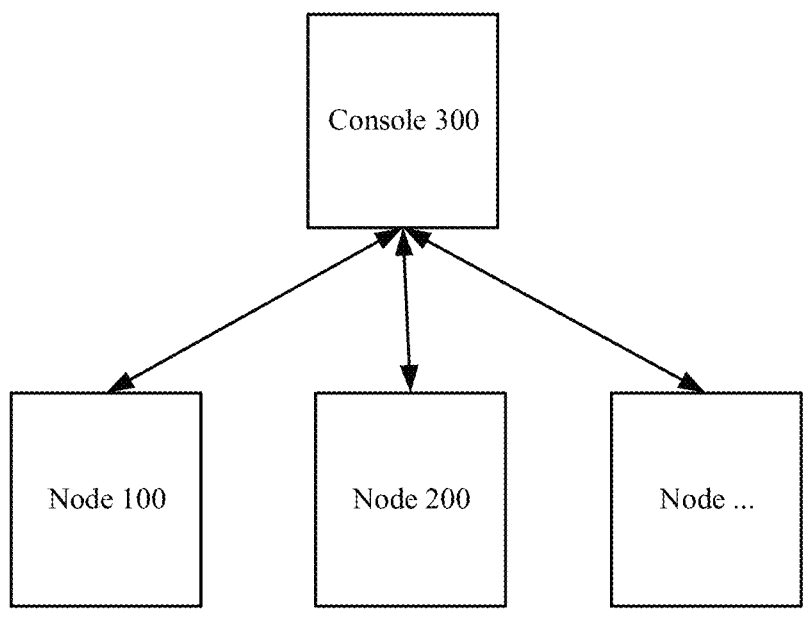
FIG. 1 is a schematic diagram of a structure of a container group management system according to an embodiment of this application.

The following describes technical solutions in embodiments of the present disclosure with reference to the accompanying drawings. It is clear that the described embodiments are merely some rather than all of embodiments of this specification.

In the descriptions of this specification, "an embodiment", "some embodiments", or the like indicates that one or more embodiments of this specification include features, structures, or characteristics described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this specification, "a plurality of" means two or more than two.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "comprise", "include", "have", and their variants all mean "include but are not limited to", unless otherwise emphasized in another manner.

A microservice architecture is a service-oriented architecture (SOA) that divides a complex system into a plurality of small services or applications. The small services or applications may be referred to as microservices. Each microservice is responsible for implementing one piece of independent service logic. The microservice is built based on a service function and may be deployed independently. The microservices are dependent on each other to provide a series of functions. The microservice is to be understood and modified, and this makes language and framework selection flexible. The microservice may be run in a container. A plurality of containers that are highly dependent on each other may form one container group. For example, in a K8S (Kubernetes) system, a plurality of containers may be encapsulated into one pod. That is, the container group is the pod.

In embodiments of this application, a container for running the microservice may be referred to as a service container. A sidecar may be implemented by using a container or a process. When the sidecar is implemented by using the container, the sidecar may also be referred to as a sidecar container.

In the microservice architecture, service governance is also referred to as SOA governance, and is used to manage the adoption and an implementation process of the microservice architecture. In a service mesh based on the microservice architecture, service governance may be performed by the sidecar. In the K8S (Kubernetes) system, the sidecar is a container having a sidecar function, and the sidecar provides a traffic service governance function for the service container.

In a solution, a pod-level sidecar is deployed. To be specific, each pod corresponds to one sidecar, and the sidecar is configured to perform service governance on the pod. In this solution, different sidecars correspond to different pods. If a sidecar is faulty, only a pod corresponding to the sidecar is affected, and other pods are not affected. It can be said that, this solution helps ensure a high availability capability of a service. However, in this solution, if a large quantity of pods are deployed, and a large quantity of sidecars are also deployed, computing resources occupied by the sidecars cannot be ignored, and a problem such as a large link delay may be caused.

In another solution, a node-level sidecar is deployed. To be specific, one sidecar is deployed on one node, to perform service governance on a plurality of pods on the node. In this solution, if the sidecar is faulty, the plurality of pods on the node are affected. Consequently, a high availability capability of a service is greatly affected.

For the foregoing technical problem, embodiments of this application provide a container group management system. As shown in FIG. 1, the management system may include a plurality of nodes such as a node 100, a node 200, and the like, and may further include a console 300 connected to the plurality of nodes. The console 300 may manage the plurality of nodes, for example, may send a sidecar allocation policy to any one of the plurality of nodes, so that the node can allocate a sidecar to a service container group in the node according to the sidecar allocation policy, to perform better traffic management on a data packet sent by the service container group, and implement a high availability capability of a service.

In some embodiments, the allocation policy may be configured, on the console 300, by a management personnel or a tenant of a data center in which the node is located. Therefore, the container group can be flexibly managed.

The following uses the node 100 as an example to describe an example of the node in the management system shown in FIG. 1 in embodiments of this application.

In some embodiments, the node 100 may be a virtual machine (VM).

In some embodiments, the node 100 may have a plurality of hardware components, for example, one or more processors (for example, central processing units (CPUs)) and one or more memories. The hardware component of the node 100 may provide data computing and data storage capabilities for the node 100. In an example, the node 100 may be a computer. In another example, the node 100 may be a bare metal server.

Figure 2:
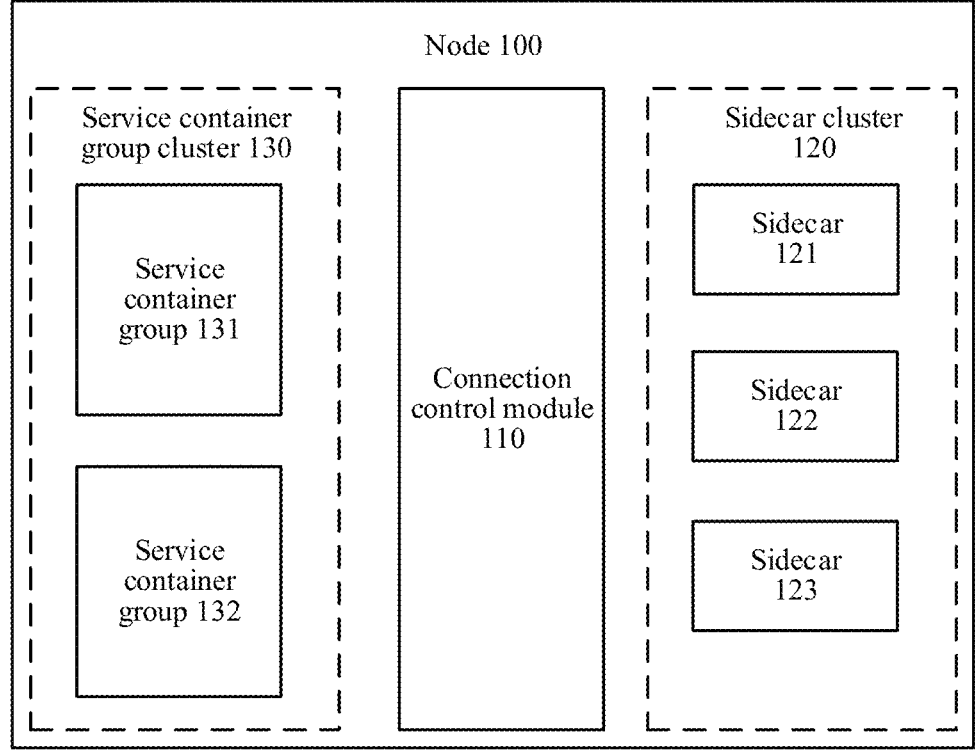
FIG. 2 is a schematic diagram of a structure of a node for running a container group according to an embodiment of this application.

Refer to FIG. 2. A connection control module 110, a sidecar cluster 120, and a service container group cluster 130 may be run on the node 100. The sidecar cluster 120 may include at least two sidecars such as a sidecar 121, a sidecar 122, and a sidecar 123. The service container group cluster 130 may include a service container group 131. The service container group 131 may include one or more containers, and an application or a microservice may be run on the container. The connection control module 110 may receive a sidecar allocation policy A sent by the console 300. When the service container group 131 has a traffic management requirement, the connection control module 110 may select a sidecar for the service container group 131 from the sidecar cluster 120 according to the allocation policy A, for example, may select the sidecar 121. Then, the connection control module 110 may forward, to the sidecar 121, a data packet sent by the service container group 131. The sidecar 121 may perform traffic management on the data packet.

In an example, traffic management may be traffic control. Traffic control may include any one or any combination of traffic passing, traffic rejection, traffic replication, and traffic coloring. In an example, traffic management may be traffic securing. Traffic securing may include performing encryption, decryption, or the like on the data packet. In an example, traffic management may be traffic observation. Traffic observation may include drawing an invocation chain and the like in the console 300.

In some embodiments, a sidecar list may be configured for the connection control module. A data plane proxy list may include information about a sidecar in a running state. The information about the sidecar may include an identifier (for example, a process identity (ID)) of the sidecar and a listening port of the sidecar. The listening port of the sidecar may also be referred to as an inbound port of the sidecar. The data packet sent by the service container group 131 may be sent to the sidecar 121 through a listening port of the sidecar 121, so that the sidecar 121 can perform traffic management on the data packet.

In some embodiments, a specification of a hardware resource allocated to the sidecar 121 is higher than that of a hardware resource allocated to the sidecar 122, the sidecar allocation policy A includes a policy A1, and the policy A1 indicates the service container group 131 to preferentially use the sidecar 121. Therefore, the connection control module 110 may select the sidecar 121 from the sidecar cluster 120 according to the policy A1, so that the sidecar 121 performs service governance (namely, traffic management) on the data packet sent by the service container group 131. An implementation process of this embodiment is described in the following Embodiment 2, and details are not described herein.

In some embodiments, still refer to FIG. 2. The service container group cluster 130 may further include a service container group 132. When the service container group 132 has a traffic management requirement, the connection control module 110 may further select the sidecar 122 from the sidecar cluster 120 according to the allocation policy A, and forward, to the sidecar 122, a data packet sent by the service container group 132. Then, the sidecar 122 may perform traffic management on the data packet.

In some embodiments, a same sidecar in the sidecar cluster 120 may simultaneously perform traffic management on data packets sent by a plurality of service container groups. For example, it may be set that the service container group cluster 130 may further include the service container group 132. The sidecar allocation policy A further includes a policy A2, and the policy A2 may indicate that a quantity of objects served by a sidecar does not exceed an upper limit value. The object served by the sidecar is a service container group that accepts a traffic management service of the sidecar. In other words, if a sidecar performs traffic management on a data packet sent by a service container group, the service container group is an object served by the sidecar. The upper limit value of the sidecar is a maximum quantity of service container groups on which the sidecar can perform traffic management at a same moment. The connection control module may determine a quantity of objects served by the sidecar 121, and forward, to the sidecar 121 when the quantity of objects served by the sidecar 121 does not exceed an upper limit value of the sidecar 121, the data packet sent by the service container group 132. Then, the sidecar 121 may simultaneously perform traffic management on the data packet sent by the service container group 131 and the data packet sent by the service container group 132.

In some embodiments, after a sidecar is faulty, for example, after the sidecar crashes or restarts, a sidecar may be reselected for an object served by the sidecar, so that the newly selected sidecar continues to perform traffic management on the object served by the sidecar that is faulty. The sidecar 121 is still used as an example. As described above, before the sidecar 121 is faulty, the sidecar 121 may perform traffic management on the data packet sent by the service container group 131. After the sidecar 121 is faulty, the connection control module 110 may re-determine a sidecar for the service container group 131. The re-determined sidecar may perform traffic management on the data packet sent by the service container group 131. For example, re-determining a sidecar for the service container group 131 may be as follows: The connection control module 110 reselects, from the sidecar cluster 120, a sidecar for performing traffic management on the data packet of the service container group 131. For example, it may be set that the sidecar cluster 120 includes the sidecar 123, and the connection control module 110 selects the sidecar 123 from the sidecar cluster 120, so that the sidecar 123 performs traffic management on the data packet sent by the service container group 131. In one embodiment, the data packet sent by the service container group 131 may be sent to the sidecar 123, so that the sidecar 123 performs traffic management on the data packet. For example, the re-determining a sidecar for the service container group 131 may be as follows: The connection control module creates the sidecar 123 in the node 100 by using the console 300, and then sends, to the sidecar 123, the data packet sent by the service container group 131, so that the sidecar 123 can perform traffic management on the data packet. A process of creating the sidecar 123 in the node 100 is described in the following Embodiment 1, and details are not described herein.

In some embodiments, the sidecar 123 may be a new-version sidecar whose function is upgraded based on the sidecar 121. A version upgrade process of a sidecar is described below, and details are not described herein.

In some embodiments, the sidecar 123 is a replication version of the sidecar 121. In other words, the console 300 may re-create, in the node 100, a sidecar having a same function as the sidecar 121.

In some embodiments, after performing traffic management on the data packet sent by the service container group 131, the sidecar 121 sends the data packet to a back-end container group. In an example, the back-end container group may be a service container group on another node, for example, the node 200. In an example, the back-end container group may be a service container group other than the service container group 131 on the node 100.

In an example of these embodiments, the sidecar 121 may further generate a session identifier, and send the session identifier to the service container group 131 and the connection control module 110. The session identifier may be a session identifier between the service container group 131 and the back-end container group. The connection control module 110 may record a correspondence between the session identifier and the back-end container group. When performing traffic management on the data packet sent by the service container group 131, the sidecar 123 may obtain the session identifier from the service container group 131, and then determine the back-end container group based on the correspondence between the session identifier and the back-end container group and the session identifier obtained from the service container group 131, so that the sidecar 123 sends a new data packet to the back-end container group after performing traffic management on the new data packet sent by the service container group 131. The new data packet may be a data packet sent by the service container group 131 after the sidecar 123 determines the back-end container group based on the correspondence between the session identifier and the back-end container group and the session identifier obtained from the service container group 131. Descriptions are provided in the following Embodiment 4, and details are not described herein.

In some embodiments, the sidecar allocation policy A may include a policy A3, and the policy A3 indicates that a sidecar in the sidecar cluster 120 is preferentially used when a quantity of objects served by the sidecar is 0. The connection control module 110 may determine the quantity of objects served by the sidecar 121, and forward, to the sidecar 121 when the quantity of objects served by the sidecar 121 is 0, the data packet sent by the service container group 131. A served object is a service container group served by a sidecar. For details, refer to content implementation described in the following Embodiment 2, and the details are not described herein.

In some embodiments, the connection control module 110 is further configured to: monitor a working status of each sidecar in the sidecar cluster 120, and when finding that there is an offline sidecar, send information about the offline sidecar to the console 300. Descriptions are provided in the following Embodiment 1, and details are not described herein.

A plurality of sidecars may be run on the node provided in embodiments of this application, and the node may select a sidecar for a service container group from the plurality of sidecars according to an allocation policy, and then perform, by using the selected sidecar, traffic management on a data packet sent by the service container group, so that better traffic management can be performed on the data packet of the service container group, and a high availability capability of a service can be implemented.

The following describes, in embodiments, the node and the container group management solution that are provided in embodiments of this application.

Embodiment 1

Figure 3A:
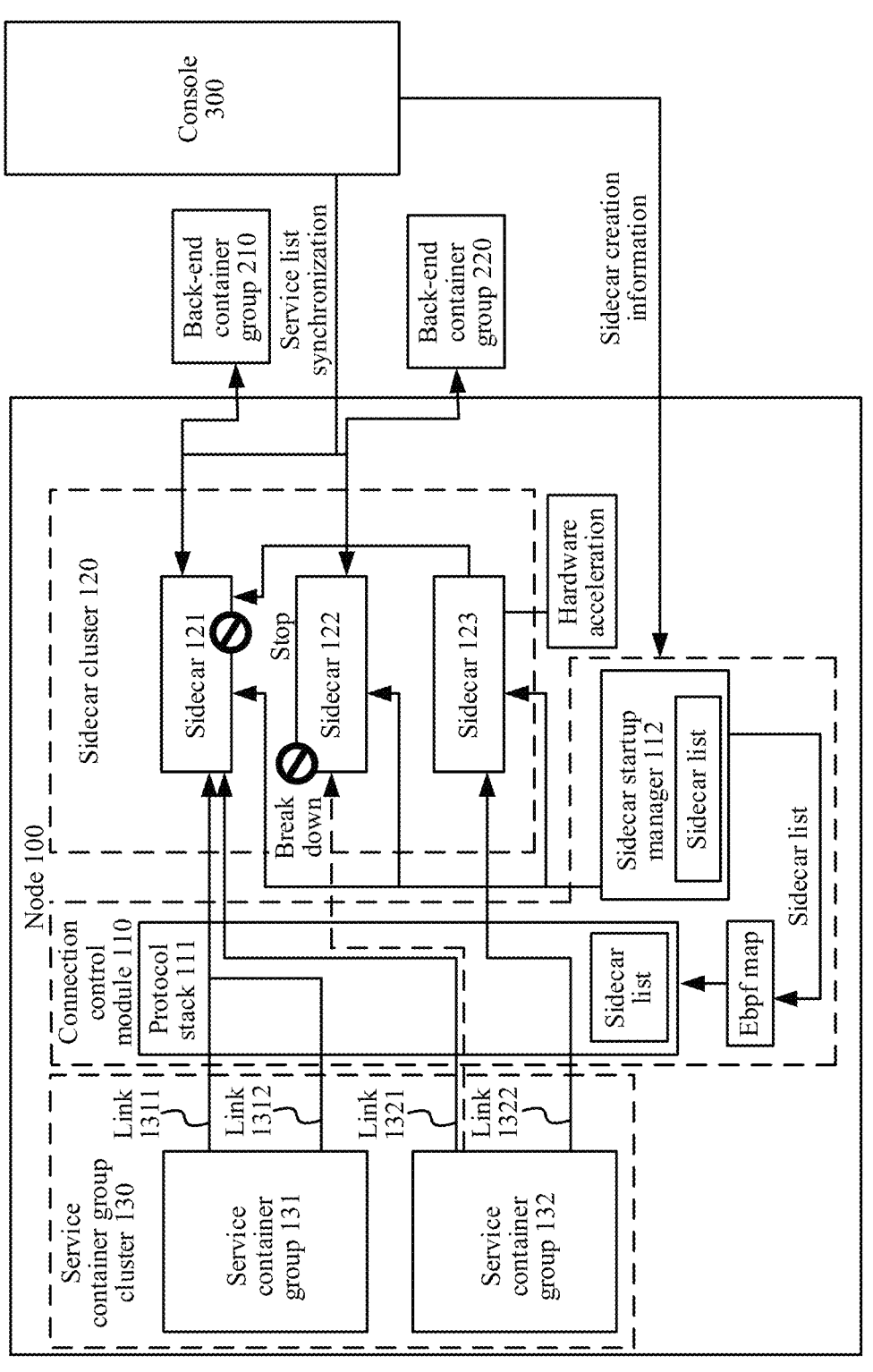
FIG. 3A is a schematic diagram of a container group management framework according to an embodiment of this application.

Refer to FIG. 3A. This embodiment provides a node 100. A service container group cluster 130 may be run on the node 100, and includes a plurality of service container groups such as a service container group 131, a service container group 132, and the like. A sidecar cluster 120 may be further run on the node 100, and includes a plurality of sidecars such as a sidecar 121, a sidecar 122, a sidecar 123, and the like. For example, each of the plurality of sidecars may be bound to a different hardware resource, for example, may be bound to one or more central processing units (CPUs), or may be bound to another computing module (for example, hardware specially used for encryption and decryption, or a graphics processing unit (GPU)). A connection control module 110 is further run on the node 100. For example, the connection control module 110 may include a protocol stack 111 and a sidecar startup manager 112.

The node 100 may access a network, where the network may include a plurality of back-end container groups such as a back-end container group 210, a back-end container group 220, and the like. In an example, the back-end container group may be run on a node other than the node 100 in the network. In another example, the back-end container group may be run on the node 100. After traffic management is performed by the sidecar on a data packet sent by the service container group in the node 100, the data packet may be sent to the back-end container group, to invoke a service of the back-end container group or provide a service for the back-end container group.

The network may further include a console 300. The console 300 may receive an operation of a management personnel or an operation and maintenance personnel, and control the node 100 and another node in the network in response to the operation. For example, the console 300 may send a service list to the sidecar, to synchronize the service list, so that the sidecar can perform traffic management based on the service list. For another example, the console 300 may send a sidecar allocation policy A to the connection control module 110, so that the connection control module 110 selects a sidecar for the service container group from the sidecar cluster according to the sidecar allocation policy A. The selected sidecar performs traffic management on a data packet sent by the service container group.

The connection control module 110 may manage the plurality of sidecars in the node 100 in a multi-active manner. In other words, the plurality of sidecars may simultaneously be in a running state or a working state.

For example, a same sidecar may simultaneously provide traffic management for links of the plurality of service container groups. In an example, as shown in FIG. 3A, the sidecar 121 may simultaneously provide traffic management for a link 1311, a link 1312, and a link 1321. The link 1311 and the link 1312 are links from the service container group 131, and the link 1321 is a link from the service container group 132.

For example, different sidecars may simultaneously provide traffic management for different links of a same service container group. In an example, as shown in FIG. 3A, the sidecar 121 may provide traffic management for the link 1321 from the service container group 132. The sidecar 123 may provide traffic management for a link 1322 from the service container group 132.

In this embodiment, providing traffic management for a link of a service container group may be providing traffic management for a data packet sent by the service container group through the link. For example, traffic control, traffic securing, and traffic observation are performed on the data packet. Traffic control may include any one or any combination of traffic passing, traffic rejection, traffic replication, and traffic coloring.

Still refer to FIG. 3A. The node 100 may further include a protocol stack 111, which may be used to: when a service container group generates a connection request, allocate a sidecar to the connection request from the sidecar cluster 120, to establish a link between the service container group and the allocated sidecar, so that the allocated sidecar can provide traffic management for a data packet sent by the service container group through the link.

The following describes a solution of allocating a sidecar to a connection request.

The protocol stack 111 may invoke or read a sidecar list. For example, as shown in FIG. 3A, the sidecar list may be set in the protocol stack 111. The sidecar list may include information about a sidecar in a running state. The information about the sidecar may include an identifier (for example, a process identity (ID)) of the sidecar, version information of the sidecar, and a listening port of the sidecar. The version information of the sidecar represents a sidecar version. In an example, the version information of the sidecar may be a version number. A value of the version number represents a high version or a low version. The listening port of the sidecar may also be an inbound port of the sidecar. A connection request may be sent to the sidecar through the listening port of the sidecar, so that a link between a source service container group generating the connection request and the sidecar can be established.

For example, the information about the sidecar may further include a quantity of current connections of the sidecar. The quantity of current connections represents a quantity of links currently connected to the sidecar. The sidecar 121 shown in FIG. 3A is used as an example. The sidecar 121 is connected to the link 1311, the link 1312, and the link 1321, and therefore, a quantity of current connections is 3.

For example, the information about the sidecar may further include an identifier of a service container group currently connected to the sidecar. The identifier of the service container group uniquely identifies the service container group. Therefore, the protocol stack 111 may determine, based on the identifier of the service container group currently connected to the sidecar, the service container group currently connected to the sidecar. The service container group connected to the sidecar is a service container group that has a link with the sidecar. For example, as shown in FIG. 3A, the service container group 131 is a service container group currently connected the sidecar 121.

For example, the information about the sidecar may further include information about a hardware resource bound to the sidecar (for example, CPU information and information indicating whether hardware acceleration is enabled). In another embodiment, the sidecar list may further include other information, which is not listed one by one herein.

When a service container group P generates a connection request P1, the connection request P1 may be sent to the protocol stack 111. The protocol stack 111 may read sidecar information recorded in the sidecar list, and allocate a sidecar to the connection request P1 based on the sidecar information. The following provides descriptions.

In an illustrative example, the protocol stack 111 may determine whether the service container group P is a service container group currently connected a sidecar, to be specific, determine whether one or more links already exist between the service container group P and the sidecar in the sidecar list.

If the one or more links already exist between the service container group P and the sidecar in the sidecar list, it may be set that one or more links already exist between the service container group P and a sidecar B1. In this case, the sidecar B1 may be allocated to the connection request P1. Further, the protocol stack 111 may send the connection request P1 to the sidecar B1. For example, the protocol stack 111 may send the connection request P1 through a listening port of the sidecar B1, so that the connection request P1 can be sent to the sidecar B1. When the sidecar B1 receives the connection request P1, another link may be established between the sidecar B1 and the service container group P based on the connection request P1. The service container group P may send a data packet to the sidecar B1 through the link. After receiving the data packet, the sidecar B1 may perform traffic management on the data packet.

If no link exists between the service container group P and the sidecar in the sidecar list, to be specific, the service container group P is not a service container group currently connected any sidecar in the sidecar list, a sidecar with a smallest quantity of current connections may be determined based on a quantity of current connections of each sidecar in the sidecar list. It may be set that, a quantity of current connections of a sidecar B2 in the sidecar list is the smallest. The sidecar B2 may be allocated to the connection request P1. When the sidecar B2 receives the connection request P1, another link may be established between the sidecar B2 and the service container group P based on the connection request P1. The service container group P may send a data packet to the sidecar B2 through the link. After receiving the data packet, the sidecar B2 may perform traffic management on the data packet.

In an illustrative example, when receiving the connection request P1, the protocol stack 111 may determine whether a new-version sidecar exists in the sidecar list. In one embodiment, it may be determined whether versions of all sidecars in the sidecar list are the same. If a version of one or more sidecars in the sidecar list is higher than a version of another sidecar, it may be determined that the one or more sidecars are new-version sidecars. If versions of all sidecars in the sidecar list are the same, it may be determined that no new-version sidecar exists in the sidecar list.

When a new-version sidecar exists in the sidecar list, the new-version sidecar may be allocated to the connection request P1. When the new-version sidecar receives the connection request P1, another link is established between the new-version sidecar and the service container group P based on the connection request P1. The service container group P may send a data packet to the new-version sidecar through the link. After receiving the data packet, the new-version sidecar may perform traffic management on the data packet.

In an illustrative example, the sidecar in the node 100 may be hot upgraded. In other words, the sidecar may be upgraded without user awareness.

Figure 3B:
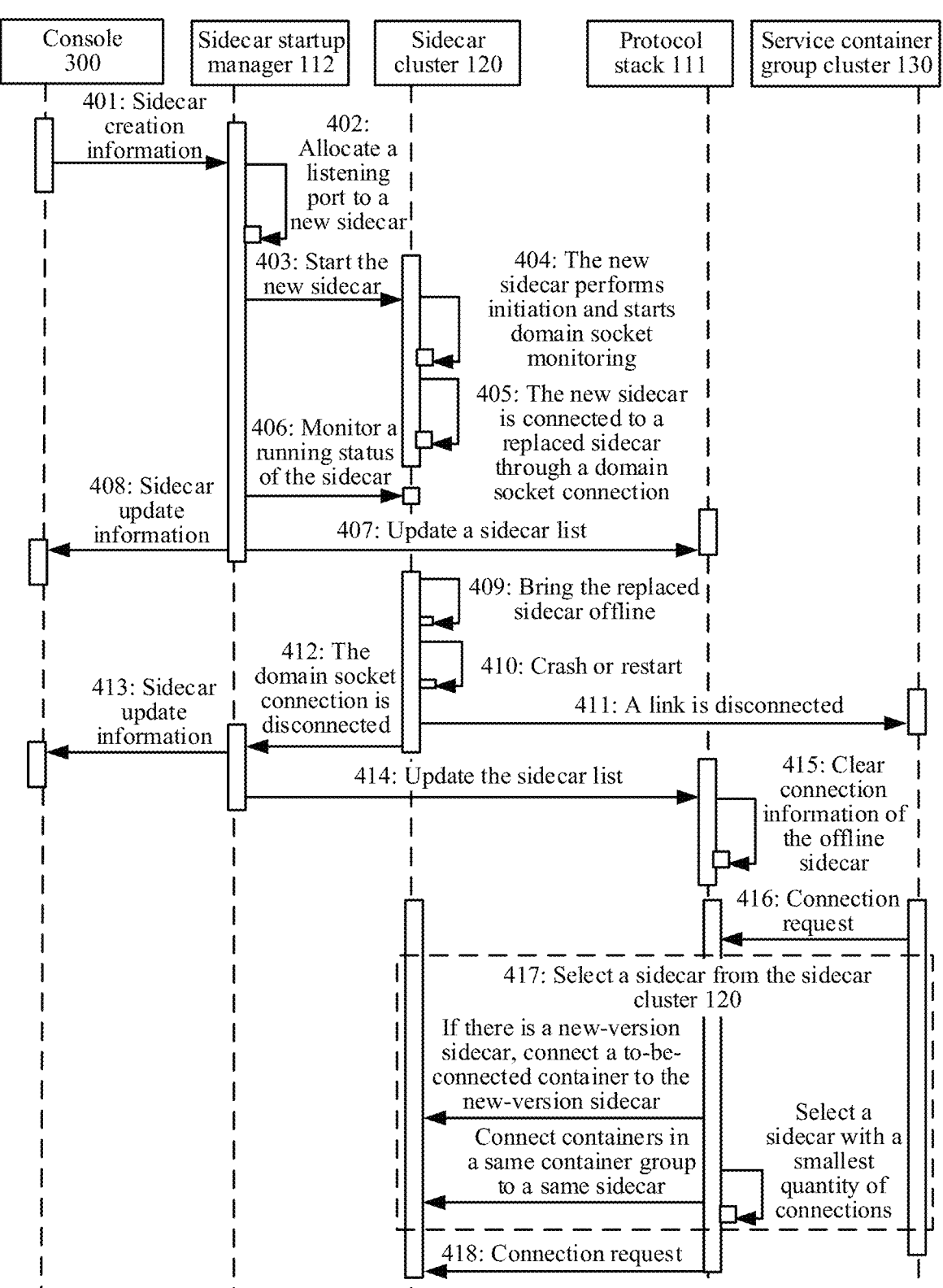
FIG. 3B is a flowchart of a container group management method according to an embodiment of this application.

The following provides, with reference to FIG. 3B, more detailed descriptions of the sidecar allocation solution and the sidecar upgrade solution that are provided in Embodiment 1.

The operation and maintenance personnel may configure sidecar creation information on the console 300 to create a new sidecar in the node 100. The sidecar creation information may include version information and hardware resource information.

The sidecar creation information may further include information about a replaced sidecar, and indicates which sidecars in the node 100 are replaced by the newly created sidecar. The replaced sidecar may be a sidecar that is already in a running state in the node 100. The information about the replaced sidecar may include an identifier of the replaced sidecar, remaining running duration of the replaced sidecar, and the like. For example, when there are a plurality of replaced sidecars, different remaining running duration may be set for different replaced sidecars, to prevent or alleviate a problem that a quantity of connection requests increases suddenly because the plurality of replaced sidecars go offline simultaneously. In addition, when the sidecar creation information includes the information about the replaced sidecar, the sidecar creation information may also be referred to as sidecar upgrade information, in other words, the sidecar creation information may be used to upgrade the sidecar.

After the foregoing configuration is performed, the console 300 may perform operation 401 of sending the sidecar creation information to the sidecar startup manager 112.

The sidecar startup manager 112 may create a new sidecar based on the sidecar creation information. When the sidecar creation information includes the version information, the sidecar startup manager 112 creates a sidecar matching the version information. In other words, a version of the newly created sidecar matches the version information. In a process of creating a sidecar, the sidecar startup manager 112 may further perform operation 402 of allocating a listening port to the new sidecar. For example, the sidecar startup manager 112 may allocate the listening port to the new sidecar based on a listening port occupation status in the node 100. When the listening port is allocated, a listening port number may be allocated to the new sidecar to complete listening port allocation. The sidecar startup manager 112 may perform operation 403 of starting the new sidecar. In this way, the new sidecar is created on a side of the sidecar.

The new sidecar may perform operation 404 in which the new sidecar may perform initialization and enter a running state.

After the new sidecar performs operation 404, the sidecar startup manager 112 may perform operation 407 of updating the sidecar list, and may send an updated sidecar list to the protocol stack 111. The updating the sidecar list includes: adding information (for example, information such as the listening port, version information, a quantity of current connections, an identifier of a currently connected service container group, and hardware resource information) about the new sidecar to the sidecar list. For example, the sidecar startup manager 112 may include the updated sidecar list in an Ebpf (extended BPF) map, and then send the Ebpf map to the protocol stack 111, to send the updated sidecar list to the protocol stack 111.

In some embodiments, after the new sidecar performs operation 404, the sidecar startup manager 112 may perform operation 406 of monitoring a running status of the sidecar. In some embodiments, the sidecar startup manager 112 may establish a domain socket persistent connection between the sidecar startup manager 112 and the sidecar, monitor the running status of the sidecar through the domain socket persistent connection, and perform operation 407 or operation 408 based on a result obtained through monitoring. In operation 408, the sidecar startup manager 112 may send sidecar update information to the console 300, where the sidecar update information includes the running status, identification information, and the like of the new sidecar.

In addition, when the sidecar creation information includes the information about the replaced sidecar, the new sidecar may further start domain socket monitoring in operation 404. In addition, the new sidecar may further perform operation 405 in which the new sidecar is connected to the replaced sidecar by using a domain socket. The new sidecar may monitor a running status of the replaced sidecar by using the domain socket between the new sidecar and the replaced sidecar, and send an offline instruction to the replaced sidecar, to indicate the replaced sidecar to go offline. When the information about the replaced sidecar includes the remaining running duration of the replaced sidecar, the new sidecar starts timing after initialization is completed. When the timing reaches the remaining running duration, the new sidecar may perform operation 409 of bringing the replaced sidecar offline. In one embodiment, the new sidecar may send the offline instruction to the replaced sidecar by using the domain socket between the new sidecar and the replaced sidecar. The replaced sidecar may go offline in response to the instruction.

In addition, it may be understood that one or more sidecars in the node 100 may perform operation 410 of crashing or restarting. For ease of description, crash or restarting of the sidecar may be collectively referred to as offline.

Offline of the sidecar may cause a link disconnection between the sidecar and the service container group, and cause a domain socket disconnection between the sidecar and the sidecar startup manager 112. That is, in operation 411, a link between an offline sidecar and the service container group is disconnected. In operation 412, the domain socket connection between the offline sidecar and the sidecar startup manager 112 is disconnected. When the domain socket between the offline sidecar and the sidecar startup manager 112 is disconnected, the sidecar startup manager 112 may determine that the sidecar goes offline, and then perform operation 413 of sending the sidecar update information to the console 300, where the sidecar update information includes identification information and the like of the offline sidecar.

When determining that the sidecar goes offline, the sidecar startup manager 112 may further perform operation 414 of updating the sidecar list, and may send an updated sidecar list to the protocol stack 111. The updating the sidecar list may include deleting the offline sidecar from the sidecar list or setting the offline sidecar to a non-running state. In some embodiments, the protocol stack 111 may perform operation 415 of clearing connection information of the offline sidecar. The connection information may include information such as a service container group historically connected to the offline sidecar.

When a link between the service container group and the sidecar is disconnected (for example, disconnected due to offline of the sidecar), the service container group may generate a connection request, to request to connect the sidecar again. In one embodiment, the service container group may send the connection request to the protocol stack 111 in operation 416. For ease of description, a service container group that sends a connection request may be referred to as a to-be-connected service container group. After receiving the connection request, the protocol stack 111 may perform operation 417 of selecting a sidecar for the to-be-connected service container group.

In some embodiments, the sidecar may be selected by using the following rule.

First, whether a new-version sidecar exists in the sidecar list is determined. In one embodiment, it may be determined whether versions of all sidecars in the sidecar list are the same. If a version of one or more sidecars in the sidecar list is higher than a version of another sidecar, it may be determined that the one or more sidecars are new-version sidecars. When a new-version sidecar exists in the sidecar list, the new-version sidecar may be used as the selected sidecar.

When no new-version sidecar exists in the sidecar list, it may be determined whether one or more links already exist between the to-be-connected service container group and a sidecar in the sidecar list. If one or more links already exist between the to-be-connected service container group and the sidecar B1 in the sidecar list, the sidecar B1 may be used as the selected sidecar.

If no link exists between the to-be-connected service container group and the sidecar in the sidecar list, a sidecar with a smallest quantity of current connections may be determined in the sidecar list, and the sidecar with the smallest quantity of current connections is used as the selected sidecar.

According to the foregoing rule, after the sidecar is selected, the protocol stack 111 may perform operation 418 of sending the connection request to the selected sidecar, to create a link between the sidecar and the to-be-connected service container group, so that the sidecar can perform traffic management on a data packet sent by the service container group through the link.

In some other embodiments, the sidecar may be selected by using a rule provided in the embodiment shown in FIG. 2.

The node provided in Embodiment 1 may support running of a plurality of sidecar instances, and may perform load balancing on each available sidecar instance based on a quantity of connections. The node may further support dynamic expansion of sidecar instances and hot upgrade of existing instances. A sidecar that is hot upgraded is preferentially used for a new connection, and an offline time window of the replaced sidecar is controlled, to reduce connection queue stacking caused by instantaneous connection switchover. In addition, in the node, the protocol stack and the sidecar startup manager may automatically manage a listening port of each sidecar. When a sidecar breaks down due to a problem of the sidecar, a service container group connected to the sidecar is repositioned to another available sidecar, and no manual intervention is required, thereby improving overall system availability.

Embodiment 2

This embodiment of this application provides a node 100. A sidecar cluster 120 is run on the node 100, and may include a plurality of types of sidecars. Different types of sidecars have different performance. It may be set that the sidecar cluster 120 includes a sidecar 121 and a sidecar 122. The sidecar 121 is a high-performance sidecar, and the sidecar 122 is a low-performance sidecar.

Performance of the high-performance sidecar is higher than that of a common sidecar. In one embodiment, compared with the common sidecar, more hardware resources are configured for the high-performance sidecar, for example, more CPUs may be configured, or acceleration hardware may be configured. That is, the hardware resources allocated to the high-performance sidecar are higher than those allocated to the common sidecar. Therefore, the high-performance sidecar has a stronger data processing capability than the common sidecar. When the high-performance sidecar provides traffic management for a link of a service container group, quality of service (QoS) of the service container group may be ensured. Therefore, for a service container group having a quality of service requirement, a link may be created between the service container group and a high-performance sidecar, so that the high-performance sidecar can provide traffic management for the link, to ensure quality of service of the service container group.

An operation and maintenance personnel may configure a priority list by using a console 300, where the priority list may include a plurality of types of connection requests. Different types of connection requests correspond to different types of sidecars. For example, a high-performance sidecar and a common sidecar are configured for the node 100. The priority list may include a first-type connection request and a second-type connection request. The first-type connection request corresponds to the high-performance sidecar, and the second-type connection request corresponds to the common sidecar.

In an example, each type of connection request may correspond to at least one service container group label. Different types of connection requests correspond to different service container group labels. In other words, each type of connection request may be represented by a service container group label. A service container group label indicates a type of service container group. When a service container group is a pod, a service container group label is a pod label. The priority list records a correspondence between a service container group label corresponding to a connection request and a sidecar type. For example, a type of connection request corresponds to a service container group label Q1 and a service container group label Q2, and the type of connection request corresponds to a high-performance sidecar. In this case, the priority list may record a correspondence between the service container group label Q1 and the high-performance sidecar, and also record a correspondence between the service container group label Q2 and the high-performance sidecar.

In an example, each type of connection request may correspond to at least one service type. Different types of connection requests correspond to different service types. In other words, each type of connection request may be represented by a service type. The priority list records a correspondence between a service type corresponding to a connection request and a sidecar type. For example, a type of connection request corresponds to a service type S, and the type of connection request corresponds to a high-performance sidecar. In this case, the priority list may record a correspondence between the service type S and the high-performance sidecar.

Figure 4A:
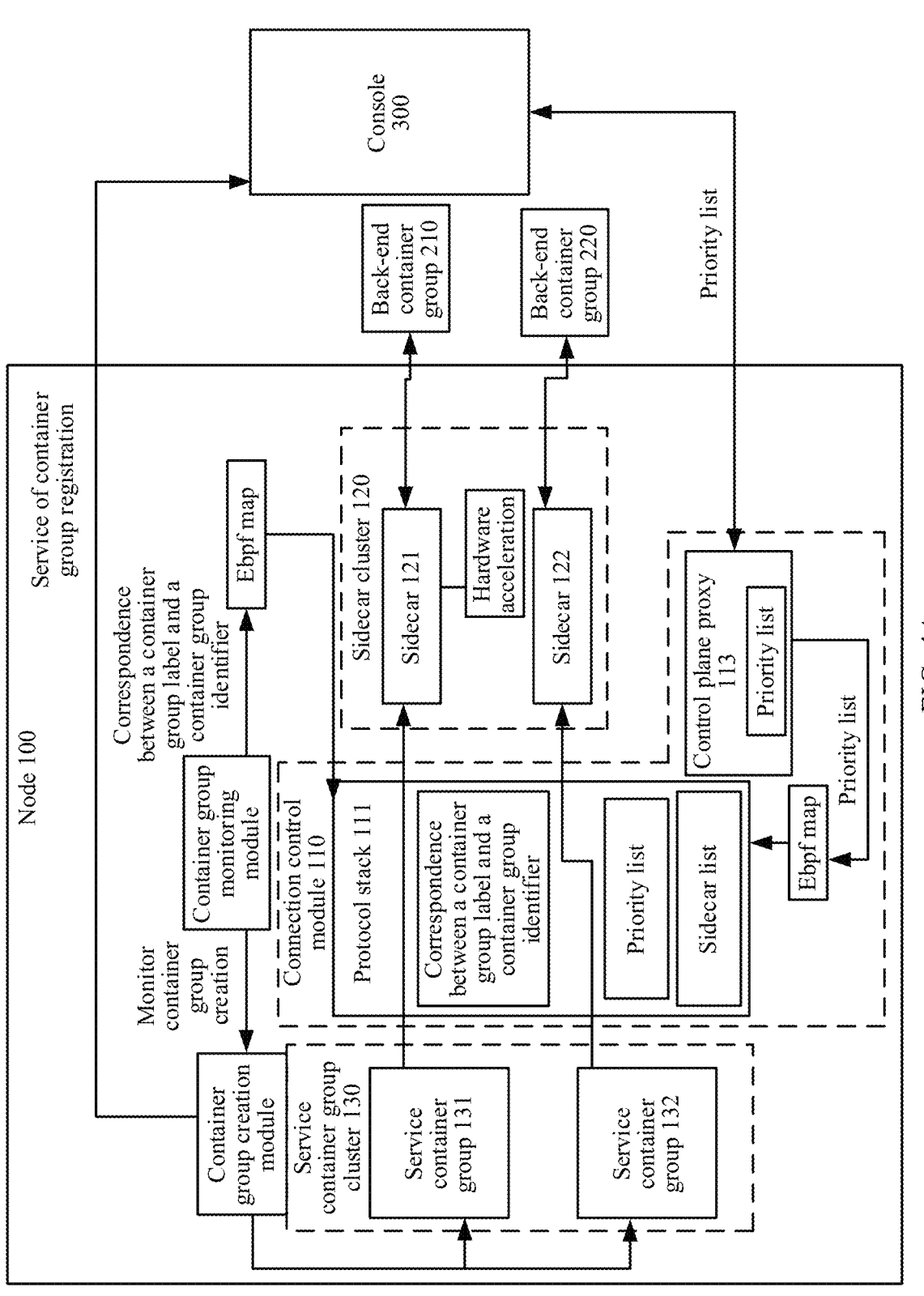
FIG. 4A is a schematic diagram of a container group management framework according to an embodiment of this application.

Refer to FIG. 4A. A connection control module 110 is further run on the node 100. The connection control module 110 may include a protocol stack 111 and a control plane proxy 113.

Refer to FIG. 4A. The console 300 may send the configured priority list to the control plane proxy 113. The control plane proxy 113 may store the priority list, and send the priority list to the protocol stack 111. For example, the control plane proxy may send the priority list to the protocol stack 111 by using an Ebpf map.

A sidecar list is further configured in the protocol stack 111, and the sidecar list records information such as a sidecar type and a listening port of a sidecar of the node 100. For a manner of obtaining and updating the sidecar list, refer to the foregoing descriptions of Embodiment 1. Different from Embodiment 1, in Embodiment 2, a correspondence between a sidecar identifier and a sidecar type may be pre-configured. Therefore, the protocol stack 111 may record the sidecar type in the sidecar list based on the correspondence between a sidecar identifier and a sidecar type.

A correspondence between a service container group label and a service container group identifier may be further configured in the protocol stack 111. In an example, the service container group identifier may be cgroup.ns (control group namespace). The service container group identifier indicates a service container group, and the service container group label indicates a type of service container group. In other words, a plurality of service container groups have a plurality of service container group identifiers, where the plurality of service container groups are in one-to-one correspondence with the plurality of service container group identifiers. When the plurality of service container groups are service container groups of a same type, service container group labels of the plurality of service container groups are the same. A manner of determining the correspondence between a service container group label and a service container group identifier is described in the following embodiment shown in FIG. 4B-1 and FIG. 4B-2, and details are not described herein.

In an illustrative example, the priority list records a correspondence between a service container group label and a sidecar type. When the protocol stack 111 receives a connection request sent by a service container group, for example, a service container group 131, the protocol stack 111 may determine a service container group identifier of the service container group 131 based on a source address (for example, a source IP address) of the connection request. Then, a service container group label of the service container group 131 may be determined based on the service container group identifier of the service container group 131 and the correspondence between a service container group label and a service container group identifier. After the service container group label of the service container group 131 is determined, a sidecar type corresponding to the service container group label of the service container group 131 may be determined based on the priority list. Then, the protocol stack 111 sends the connection request to a data proxy of the determined sidecar type. For example, it may be set that the sidecar type corresponding to the service container group label of the service container group 131 is a high-performance sidecar. In this case, the protocol stack 111 may send the connection request from the service container group 131 to the high-performance sidecar, so that the high-performance sidecar provides traffic management for a data packet from the service container group 131.

In an illustrative example, the priority list records a correspondence between a service type and a sidecar type.

When the protocol stack 111 receives a connection request sent by a service container group, for example, a service container group 132, the protocol stack 111 may determine a target service of the connection request. Then, a sidecar type corresponding to the target service may be determined based on the service type of the target service and the priority list. Then, the protocol stack 111 may send the connection request to a data proxy of the determined sidecar type. For example, it may be set that the sidecar type corresponding to the target service of the connection request sent by the service container group 132 is a common sidecar. In this case, the protocol stack 111 may send the connection request from the service container group 132 to the common sidecar, so that the common sidecar provides traffic management for a data packet from the service container group 132.

Figures 1, 4B:
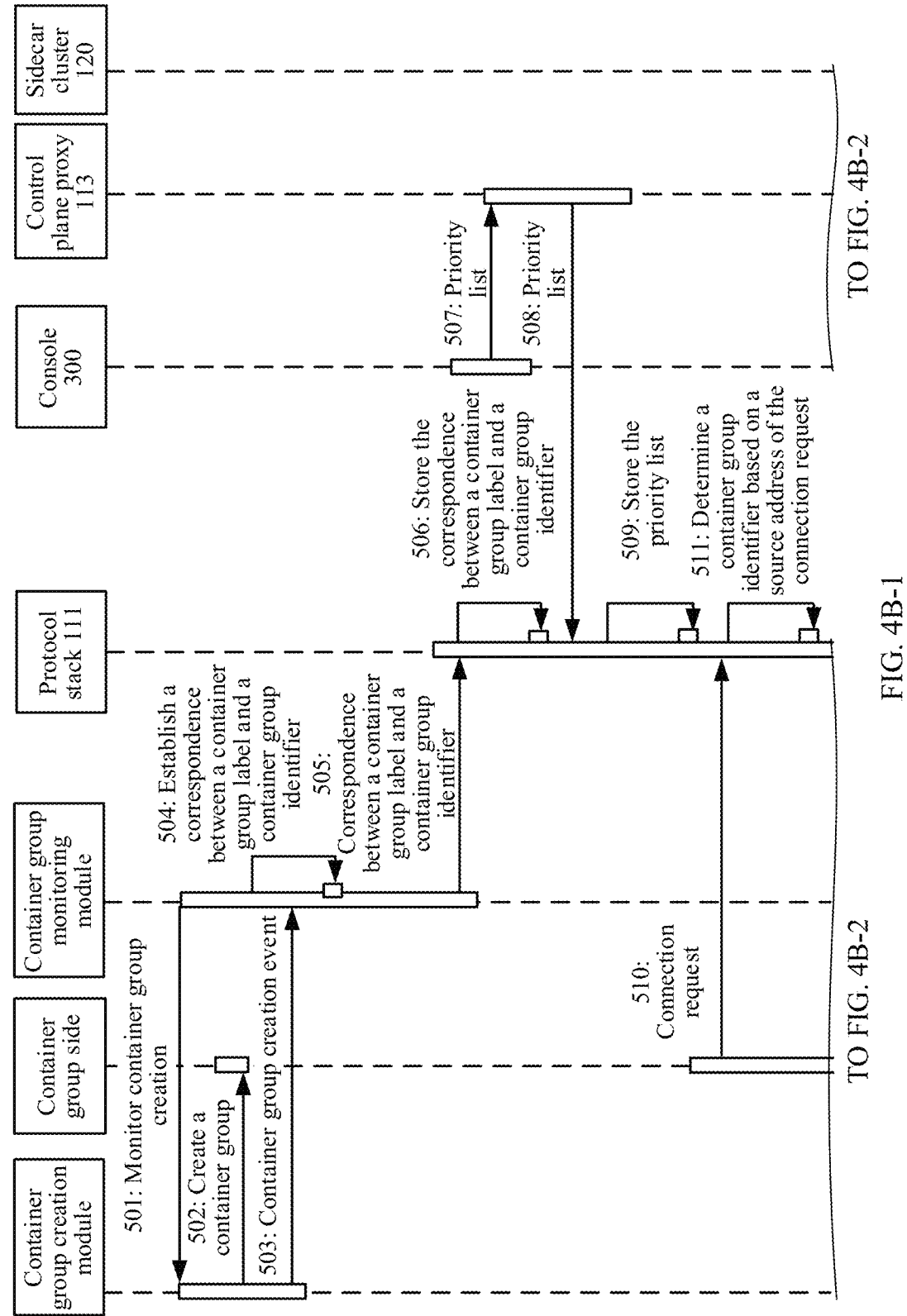

The following provides, with reference to FIG. 4B-1 and FIG. 4B-2, more detailed descriptions of the solution provided in Embodiment 2.

Refer to FIG. 4B-1 and FIG. 4B-2. A service container group monitoring module (for example, a pod monitoring module) in the node 100 may monitor a service container group creation module by using operation 501, to monitor service container group creation. For example, the service container group creation module may be Kubelet. The service container group creation module may create a service container group in operation 502. In this way, the service container group monitoring module may detect a service container group creation event by using operation 503. Based on the service container group creation event, the service container group monitoring module may obtain a service container group identifier and a service container group label of the created service container group. Then, the service container group monitoring module may perform operation 504 of establishing a correspondence between the service container group label and the service container group identifier. The service container group monitoring module may send the correspondence between the service container group label and the service container group identifier to the protocol stack 111 by using operation 505. For example, the service container group monitoring module may send the correspondence between the service container group label and the service container group identifier to the protocol stack 111 by using the Ebpf map.

The operation and maintenance personnel may configure the priority list on the console 300. For details about the priority list, refer to the foregoing descriptions, and the details are not described herein again. The console 300 may send the priority list to the control plane proxy 113 by using operation 507. The control plane proxy 113 may send the priority list to the protocol stack 111 by using operation 508. The protocol stack 111 may store the priority list by using operation 509.

The protocol stack 111 may receive, by using operation 510, a connection request sent by a service container group. For ease of description, a service container group that sends a connection request may be referred to as a to-be-connected service container group. The protocol stack 111 may parse a source address of the connection request, and determine a service container group identifier based on the source address of the connection request in operation 511. Then, the protocol stack 111 may determine a service container group label based on the determined service container group identifier in operation 512. Further, the protocol stack 111 may determine, in operation 513 based on the priority list, a sidecar type corresponding to the service container group label, to determine a sidecar type corresponding to the to-be-connected service container group.

The protocol stack 111 may select a sidecar for the to-be-connected service container group in operation 514.

If the priority list is empty, to be specific, no correspondence between the connection request and the sidecar type is configured, a sidecar with a smallest quantity of current connections is selected from the sidecar list.

If a quantity of current connections of a high-performance sidecar is zero, and the to-be-connected service container group does not correspond to the high-performance sidecar, a sidecar with the smallest quantity of current connections is selected from the sidecar list. In other words, when the high-performance sidecar is not connected to the service container group, even if the to-be-connected service container group does not correspond to the high-performance sidecar, the high-performance sidecar may be allowed to provide traffic management for the to-be-connected service container group, so that overall resource utilization of the sidecar can be improved when the high-performance sidecar is idle.

If the service container group corresponds to a high-performance sidecar, the high-performance sidecar is selected.

Then, the protocol stack 111 may perform operation 515 of sending the connection request to the selected sidecar. In this way, a link is created between the sidecar and the to-be-connected service container group, so that the sidecar can perform traffic management on a data packet sent by the service container group through the link.

In the solution provided in Embodiment 2, when multi-active high availability is supported in Embodiment 1, traffic management supports to be performed on different types of service container groups or target services by using sidecars with different performance, to ensure that independent or more hardware resources are used for some connection requests that require high quality of service, and overall resource utilization of the sidecar can be improved when the high-performance sidecar is idle.

Embodiment 3

In a service mesh system, a sidecar needs to sense a service change in the system and obtain a service list that is updated because of the service change. The service change may include service online, service offline, and the like.

Figure 5A:
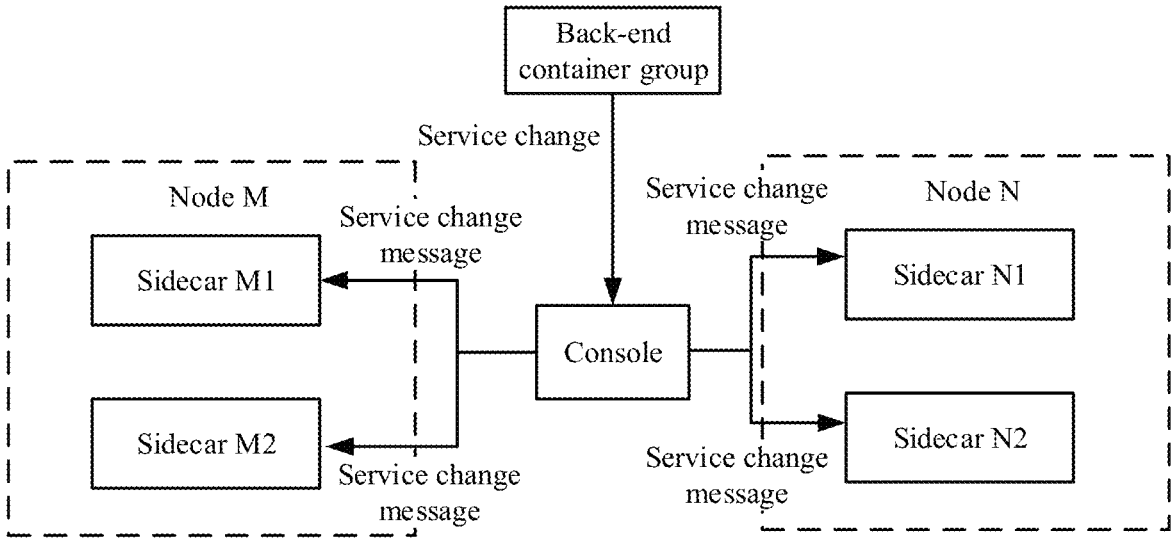
FIG. 5A is a schematic diagram of a container group management framework according to an embodiment of this application.

In a solution, refer to FIG. 5A. A socket persistent connection is established between a sidecar of each node such as a node M or a node N in the service mesh system and a control plane in the service mesh system. When a service change occurs in a back-end container group, the control plane may generate a service change message. The service change message may be used to describe the service change that occurs in the back-end container group, or the service change message includes a service list that is updated because of the service change that occurs in the back-end container group. The control plane sends the service change message to each sidecar through a persistent connection between the control plane and each sidecar. The back-end container group may be a container group that can provide a corresponding service in response to service invoking of the node M or the node N.

In this solution, if a quantity of nodes in the service mesh system increases, a quantity of connections on the control plane increases greatly. Online or offline of each service in the service mesh system may cause a service change, so that the control plane generates a service change message. The control plane needs to poll all sidecars connected to the control plane, and send the service change message. When there are a large quantity of connections of the control plane, polling the sidecars and sending the service change message consume a large quantity of computing resources of the control plane and cause great pressure on the network. In addition, the control plane performs polling and sends the service change message in a sidecar startup sequence or a random sequence. As a result, a difference between time for different sidecars in a same node to receive the service change message is large. Consequently, a time window for the sidecars in the same node to sense service instance inconsistency becomes larger, and this may cause a service exception.

In addition, a quantity of socket file descriptors of the control plane is also limited.

Therefore, in this solution, the foregoing limitations make it difficult to scale up the service mesh system.

Figure 5B:
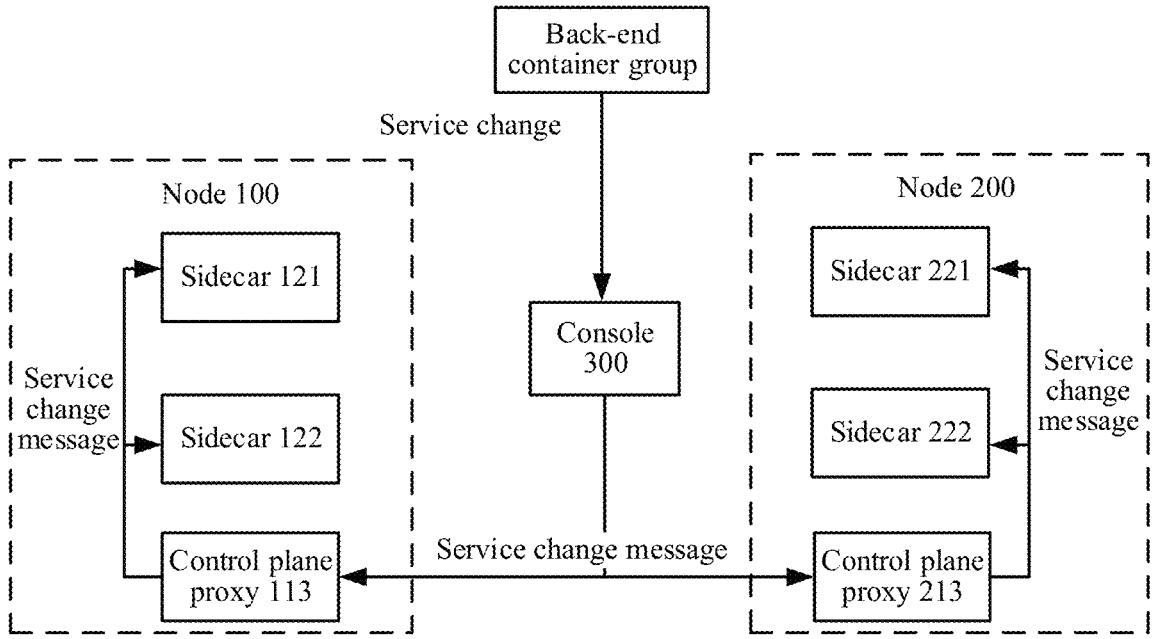
FIG. 5B is a schematic diagram of a container group management framework according to an embodiment of this application.

This embodiment provides a solution. Refer to FIG. 5B. A console 300 may establish a connection (for example, a socket persistent connection) to a control plane proxy of each node. In this way, the console 300 may send a service change message to the control plane proxy of each node. For example, the control plane sends the service change message to a control plane proxy 113 of a node 100 and a control plane proxy 213 of a node 200. Then, the control plane proxy 113 may send the service change message to each sidecar such as a sidecar 121 or a sidecar 122 in the node 100. The control plane proxy 213 may send the service change message to each sidecar such as a sidecar 221 or a sidecar 222 in the node 200.

In this way, a quantity of connections of a control plane is greatly reduced. In addition, when a service change occurs in a service mesh, the control plane performs polling and sends the service change message at a node level, to reduce consumption of computing resources on the control plane and pressure on a network. In addition, after receiving the service change message, the control plane proxy of the node sends the service change message to each sidecar in the node by using an internal communication mechanism of the node. In this way, a time window for sidecars in a same node to sense service instance inconsistency is greatly reduced.

In addition, in this embodiment, when a fault occurs in a network between the control plane and the control plane proxy, the control plane proxy may be used as an offline service center, and provide a read function for the sidecar in the node in which the control plane proxy is located, to implement communication between the sidecar and a control side. The control side includes the control plane proxy and the control plane.

Figures 5C, 6A:
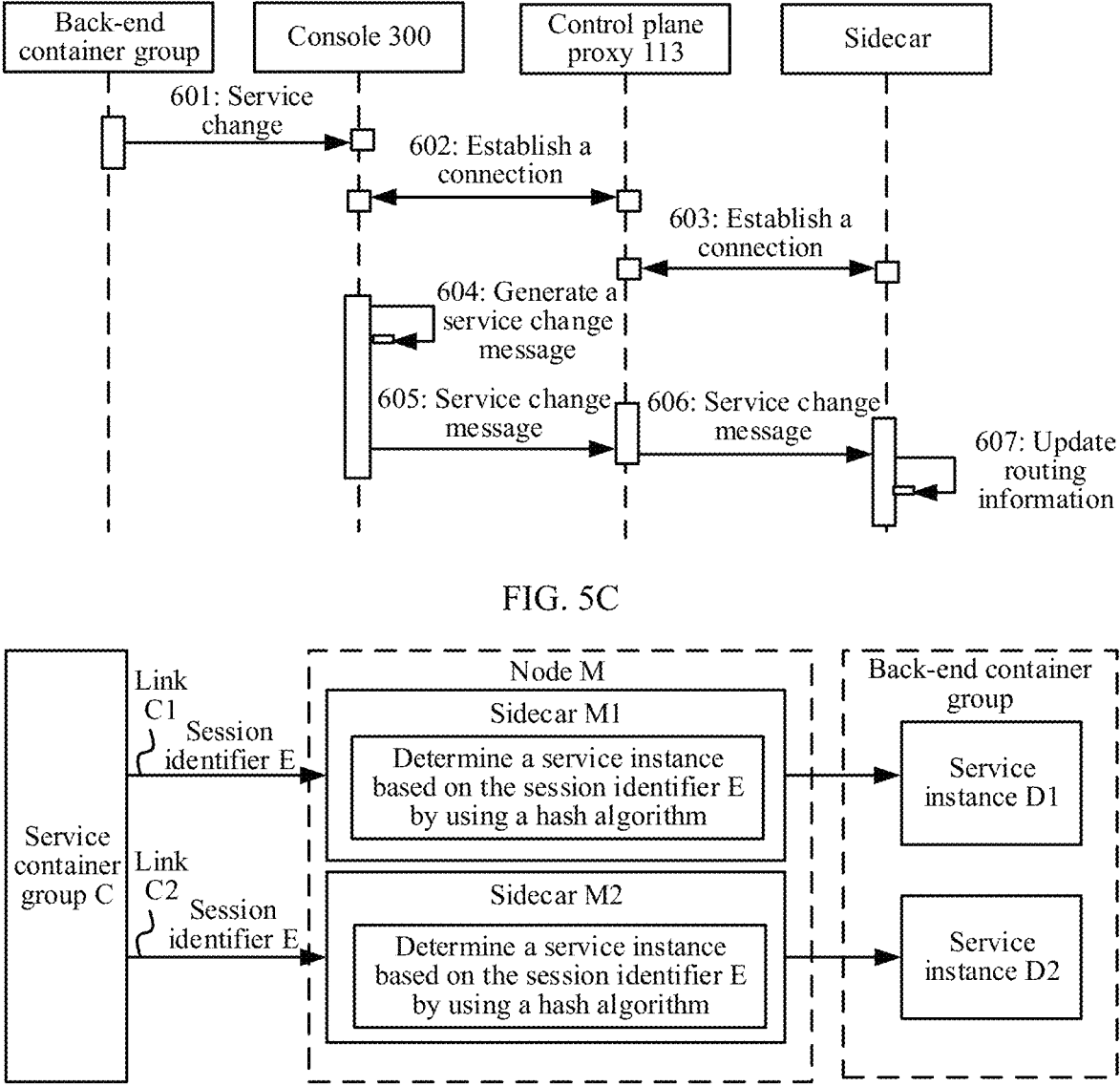
FIG. 5C is a flowchart of a container group management method according to an embodiment of this application.
FIG. 6A is a schematic diagram of a container group management framework according to an embodiment of this application.

The following provides, with reference to FIG. 5C, more detailed descriptions of the solution provided in Embodiment 3.

Refer to FIG. 5C. The console 300 may perform service change monitoring on a back-end container group by using operation 601. In addition, in operation 602, a connection between the console 300 and the control plane proxy 113 in the node 100 is established. The connection may be a socket persistent connection. In operation 603, the control plane proxy 113 may establish a connection to the sidecar in the node in which the control plane proxy 113 is located.

When sensing that a service change occurs in the back-end container group, the console 300 may generate a service change message in operation 604, and send the service change message to the control plane proxy by using operation 605.

After receiving the service change message, the control plane proxy may send the service change message to the sidecar by using operation 606. The sidecar may update routing information based on the service change message in operation 607.

Embodiment 4

When a client requests a session from a server for the first time, the server creates a session for the client, and calculates a session identifier (session ID) by using a special algorithm to identify the session. The server may return the session identifier to the client. The client may store the session identifier in a local cookie. When the client re-accesses the server, the client may send the session identifier to the server. The server re-uses the session corresponding to the session identifier to provide a corresponding service for the client.

In a service mesh system, the client is a service container group that can invoke a service. The server may also be referred to as a back-end container group, and may provide a service for the service container group. The server may include a plurality of service instances, and use one or more of the service instances to provide a service for the client.

Refer to FIG. 6A. Based on the solution provided in Embodiment 1, a service container group C may be connected to a sidecar M1 through a link C1, and connected to a sidecar M2 through a link C2. The service container group C may send a connection request for the back-end container group through the link C1, where the connection request may carry a session identifier E. After receiving the connection request, the sidecar M1 may extract the session identifier E from the connection request, and then determine a routing policy based on the session identifier E by using a hash algorithm, to send the connection request to a service instance according to the routing policy. For example, it may be set that the routing policy is sending the connection request to a service instance D1 in the back-end container group.

Similarly, the service container group C may alternatively send a connection request for the back-end container group through the link C2, where the connection request may carry a session identifier E. After receiving the connection request, the sidecar M2 may extract the session identifier E from the connection request, and then determine a routing policy based on the session identifier E by using a hash algorithm, to send the connection request to a service instance according to the routing policy. For example, it may be set that the routing policy is sending the connection request to a service instance D2 in the back-end container group.

It may be understood that when the back-end container group sends a service change message, different sidecars receive the service change message at different time. As a result, sizes of hash rings used by different sidecars during hash calculation are inconsistent. For example, the sidecar M1 performs hash calculation before receiving the service change message, and the sidecar M2 performs hash calculation after receiving the service change message. In this case, when the sidecar M1 and the sidecar M2 separately perform hash calculation, sizes of hash rings used by the sidecar M1 and the sidecar M2 are inconsistent, and different routing policies are generated. In other words, different connection requests initiated by the service container group C1 may be sent to different service instances, and this may cause a service exception.

Embodiment 4 provides a solution. When different sidecars provide traffic management for different links of a same service container group, connection requests initiated by the service container group through the different links may be sent to a same service instance. The following describes the solution by using an example with reference to FIG. 4B-1 and FIG. 4B-2.

Figure 6B:
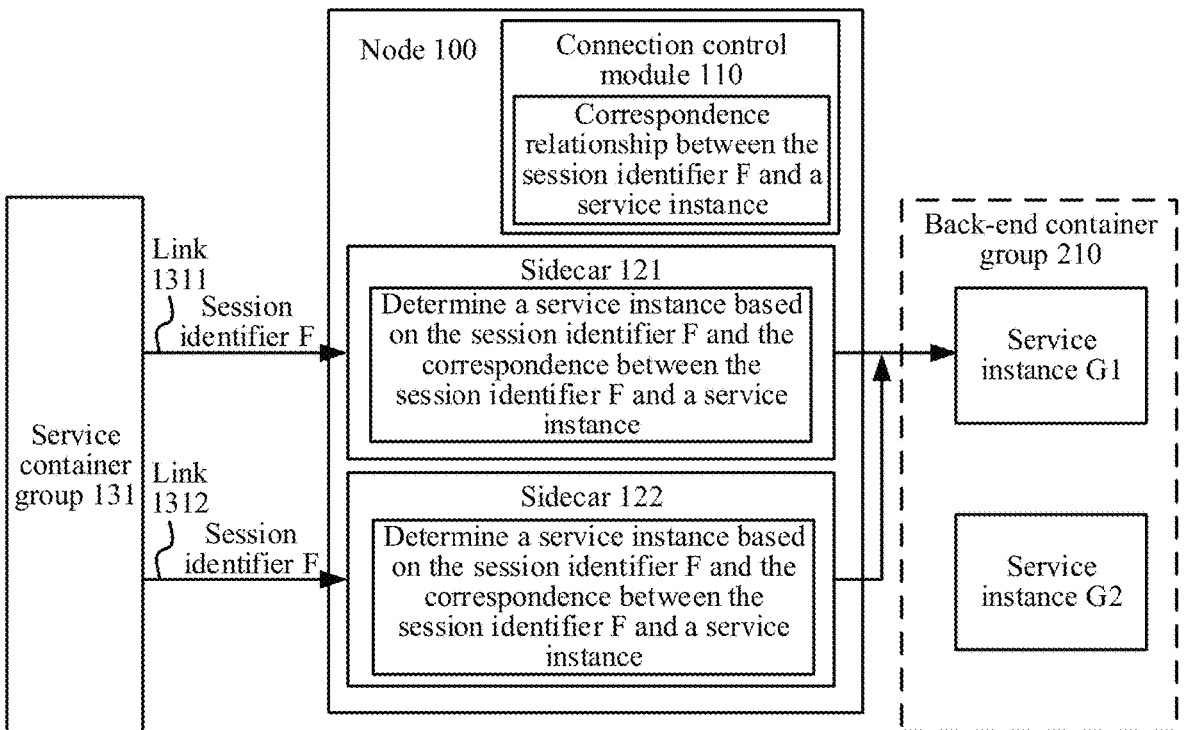
FIG. 6B is a schematic diagram of a container group management framework according to an embodiment of this application.

This solution may be applied to a container group management system shown in FIG. 6B, where the container group management system includes a node 100 and a back-end container group 210. The node 100 may include a sidecar 121 and a sidecar 122. For example, the node 100 may further include a connection control module 110. A service container group 131 may be connected to the sidecar 121 through a link 1311, and may be connected to the sidecar 122 through a link 1312. A plurality of service instances such as a service instance G1, a service instance G2, and the like may be configured in the back-end container group.

Refer to FIG. 6B. A correspondence relationship between a session identifier F and a service instance may be configured in the node 100. When a sidecar, for example, the sidecar 121, performs hash calculation based on the session identifier F to obtain a service instance corresponding to a routing policy, the sidecar 121 may establish a correspondence relationship between the session identifier F and the service instance. The sidecar 121 may share the correspondence relationship with the sidecar 122. For example, the sidecar 121 may send the correspondence relationship to the connection control module 110. The sidecar 122 may read the correspondence relationship between the session identifier F and the service instance in the connection control module 110, or may store the correspondence relationship in a local cache.

When receiving a connection request that includes the session identifier F and that is sent by the service container group 131 through the link 1311, the sidecar 121 may determine a service instance based on the correspondence between the session identifier F and the service instance, to route the connection request to the service instance. When receiving a connection request that includes the session identifier F and that is sent by the service container group 131 through the link 1312, the sidecar 122 may determine a service instance based on the correspondence between the session identifier F and the service instance, to route the connection request to the service instance. In this way, when different sidecars provide traffic management for different links of a same service container group, connection requests initiated by the service container group through the different links may be sent to a same service instance.

Figures 1, 6C:
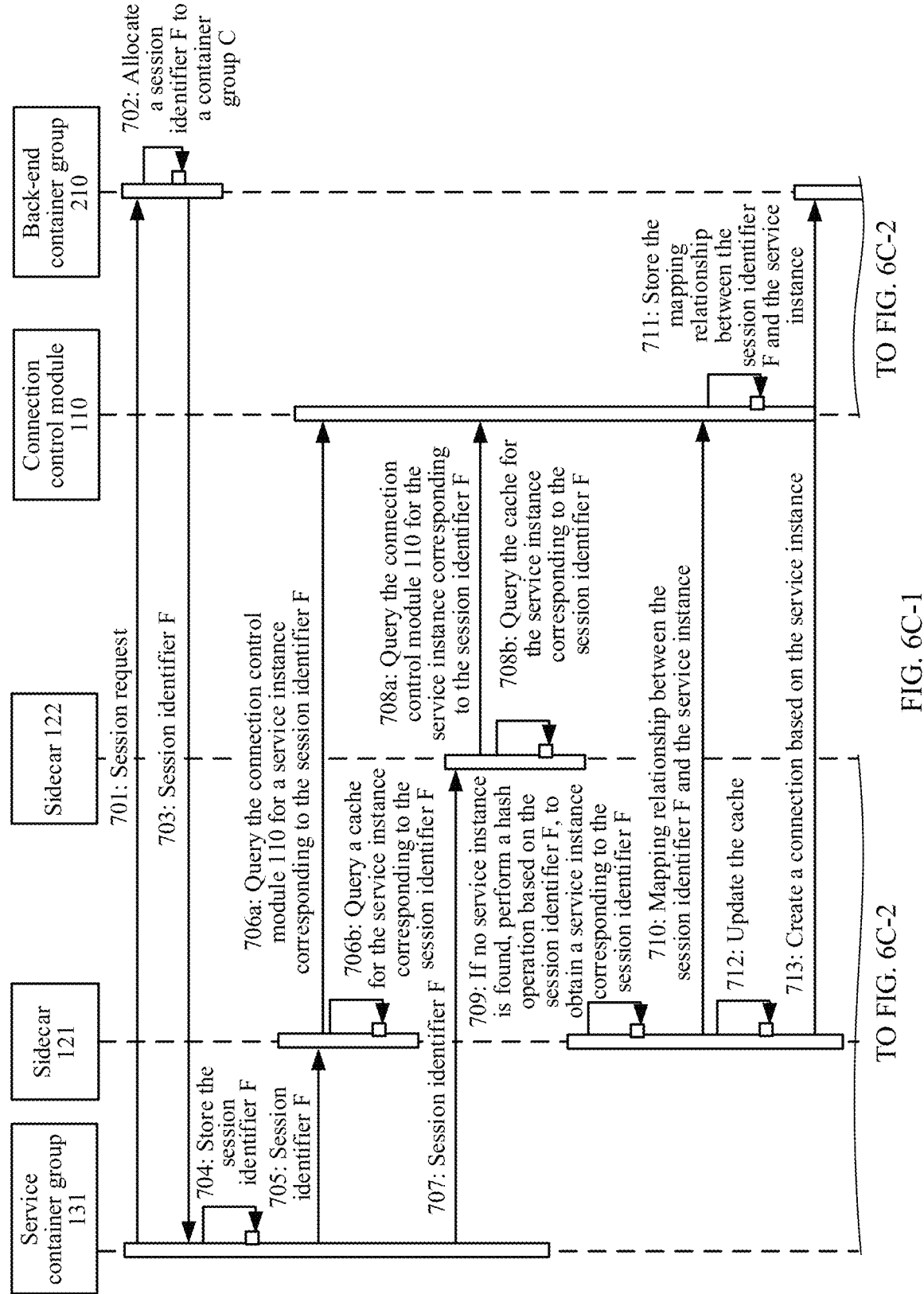

The following provides, with reference to FIG. 6C-1 and FIG. 6C-2, more detailed descriptions of the solution provided in Embodiment 4.

As shown in FIG. 6C-1 and FIG. 6C-2, the service container group 131 may send a session request to the back-end container group 210 by using operation 701. The back-end container group 210 may allocate the session identifier F to the service container group 131 in response to the session request in operation 702, and send the session identifier F to the service container group 131 by using operation 703. The service container group 131 may store the session identifier F in operation 704.

The service container group 131 may send, to the sidecar 121 by using operation 705, the connection request including the session identifier F.

In an illustrative example, when receiving the connection request including the session identifier F, the sidecar 121 may query, by using operation 706a, the connection control module 110 for the service instance corresponding to the session identifier F.

In an illustrative example, when receiving the connection request including the session identifier F, the sidecar 121 may query, by using operation 706b, a local cache of the sidecar 121 for the service instance corresponding to the session identifier F. In other words, in this example, the correspondence between the session identifier F and the service instance may be stored in the local cache of the sidecar 121.

The service container group 131 may send, to the sidecar 122 by using operation 707, the connection request including the session identifier F.

In an illustrative example, when receiving the connection request including the session identifier F, the sidecar 122 may query, by using operation 708a, the connection control module 110 for the service instance corresponding to the session identifier F.

In an illustrative example, when receiving the connection request including the session identifier F, the sidecar 122 may query, by using operation 708b, a local cache of the sidecar 122 for the service instance corresponding to the session identifier F. In other words, in this example, the correspondence between the session identifier F and the service instance may be stored in the local cache of the sidecar 122.

Still refer to FIG. 6C-1 and FIG. 6C-2. The sidecar 121 may perform operation 709. If no service instance is found, the sidecar 121 performs a hash operation based on the session identifier F, to obtain the service instance corresponding to the session identifier F. In other words, no service instance corresponding to the session identifier F is found by using operation 706a and operation 706b. This indicates that when the sidecar 122 performs operation 706a, the connection control module 110 does not store the correspondence between the session identifier F and the service instance; and when the sidecar 121 performs operation 706b, the local cache of the sidecar 121 does not store the correspondence between the session identifier F and the service instance. In this way, the sidecar 121 performs a hash operation based on the session identifier, to obtain the service instance corresponding to the session identifier F.

Then, the sidecar 121 may perform operation 710 of creating a correspondence relationship between the session identifier F and the service instance, and sending the correspondence relationship between the session identifier F and the service instance to the connection control module 110. The connection control module 110 may store the correspondence relationship between the session identifier F and the service instance in operation 711. For example, the sidecar 121 may perform operation 712 of updating the local cache, to store the correspondence relationship between the session identifier F and the service instance in the local cache.

In addition, the sidecar 121 may perform operation 713 of creating a connection based on the service instance. To be specific, the connection request is sent to the service instance corresponding to the session identifier F, to establish a connection between the service container group 131 and the service instance.

Still refer to FIG. 6C-1 and FIG. 6C-2. The sidecar 122 may perform operation 714. If no service instance is found, the sidecar 122 performs a hash operation based on the session identifier F, to obtain the service instance corresponding to the session identifier F. In other words, no service instance corresponding to the session identifier F is found by using operation 708a and operation 708b. This indicates that when the sidecar 122 performs operation 708a, the connection control module 110 does not store the correspondence between the session identifier F and the service instance; and when the sidecar 122 performs operation 708*b*, the local cache of the sidecar 122 does not store the correspondence between the session identifier F and the service instance. In this way, the sidecar 122 performs a hash operation based on the session identifier, to obtain the service instance corresponding to the session identifier F.

Then, the sidecar 122 may perform operation 715 of creating a correspondence relationship between the session identifier F and the service instance, and sending the correspondence relationship between the session identifier F and the service instance to the connection control module 110.

The connection control module 110 may perform operation 716 of determining that the correspondence relationship between the session identifier F and the service instance already exists in the connection control module 110 (where the correspondence relationship between the session identifier F and the service instance is stored in the foregoing operation 711), and no longer perform update based on the correspondence relationship that is between the session identifier E and the service instance and that is sent by the sidecar 122. The connection control module 110 may further perform operation 717 of sending, to the sidecar 122, the correspondence relationship that is between the session identifier F and the service instance and that is stored in operation 711. The sidecar 122 may perform operation 718 of updating the local cache, to store, in the local cache, the correspondence relationship that is between the session identifier F and the service instance and that is received from the connection control module 110.

The sidecar 122 may determine, based on the correspondence relationship that is between the session identifier F and the service instance and that is received from the connection control module 110, the service instance corresponding to the session identifier F. Then, the sidecar 122 may perform operation 719 of creating a connection based on the service instance. To be specific, the connection request is sent to the service instance corresponding to the session identifier F, to establish a connection between the service container group 131 and the service instance.

In addition, in an illustrative example, a lifecycle of the session identifier may be configured. The connection control module 110 may determine, when the lifecycle of the session identifier ends, that the session identifier expires, and perform operation 720 of clearing the expired session identifier. In operation 720, a correspondence relationship between the expired session identifier and the service instance is cleared. The connection control module 110 may perform operation 721*a* of sending a session identifier clearing command to the sidecar 121. In response to the session identifier clearing command, the sidecar 121 may perform operation 722*a* of clearing the cache, to clear the correspondence relationship between the expired session identifier and the service instance from the local cache. The connection control module 110 may perform operation 721*b* of sending the session identifier clearing command to the sidecar 122. In response to the session identifier clearing command, the sidecar 122 may perform operation 722*b* of clearing the cache, to clear the correspondence relationship between the expired session identifier and the service instance from the local cache.

Therefore, according to the solution provided in Embodiment 4, when different sidecars provide traffic management for different links of a same service container group, connection requests initiated by the service container group through the different links may be sent to a same service instance, so that the service instance can provide services for the service container group through the different links.

The following describes, based on the container group management solution described above, a method for managing a container group in a node provided in an embodiment of this application. It may be understood that, the method is another expression manner of the container group management solution described above, and the two are combined. The method is proposed based on the container group management solution described above. For some or all content of the method, refer to the foregoing descriptions of container group management.

A connection control module, a sidecar cluster, and a first service container group are run on the node, and the sidecar cluster includes at least two sidecars. Refer to FIG. 7. The method includes the following operations.

Operation 7001: The connection control module receives a sidecar allocation policy sent by a console connected to the node, selects a first sidecar from the sidecar cluster according to the sidecar allocation policy, and forwards, to the first sidecar, a data packet sent by the first service container group.

Operation 7002: The first sidecar performs traffic management on the data packet sent by the first service container group.

In some embodiments, a second service container group is further run on the node. The method further includes: The connection control module selects a second sidecar from the sidecar cluster according to the sidecar allocation policy, and forwards, to the second sidecar, a data packet sent by the second service container group; and the second sidecar performs traffic management on the data packet sent by the second service container group.

In an example of these embodiments, a specification of a hardware resource allocated to the first sidecar is higher than that of a hardware resource allocated to the second sidecar, the sidecar allocation policy includes a first policy, and the first policy indicates the first service container group to preferentially use the first sidecar. The selecting a first sidecar from the sidecar cluster according to the sidecar allocation policy includes: selecting the first sidecar from the sidecar cluster according to the first policy.

In some embodiments, the second service container group is further run on the node, the sidecar allocation policy further includes a second policy, and the second policy indicates that a quantity of objects served by the first sidecar does not exceed an upper limit value. The method further includes: The connection control module determines the quantity of objects served by the first sidecar, and forwards, to the first sidecar when the quantity does not exceed the upper limit value, the data packet sent by the second service container group; and the first sidecar simultaneously performs traffic management on the data packet sent by the first service container group and the data packet sent by the second service container group.

In some embodiments, the method further includes: After the first sidecar is faulty, the connection control module selects a third sidecar from the sidecar cluster, or notifies the console to create the third sidecar in the node, and forwards, to the third sidecar, another data packet sent by the first service container group; and the third sidecar performs traffic management on the another data packet sent by the first service container group.

In an example of these embodiments, the third sidecar is a new version to which a function is upgraded based on the first sidecar, or the third sidecar is a replication version of the first sidecar.

In another example of these embodiments, the method further includes: The first sidecar sends the data packet to a back-end container group after performing traffic management on the data packet sent by the first service container group.

In an example of this example, the method further includes: The first sidecar generates a session identifier, and sends the session identifier to the first service container group and the connection control module; the connection control module records a correspondence between the session identifier and the back-end container group; and the third sidecar obtains the session identifier from the first service container group, determines, based on the session identifier, the back-end container group in the correspondence recorded by the connection control module, and sends the another data packet to the back-end container group after performing traffic management on the another data packet sent by the first service container group.

In some embodiments, the sidecar allocation policy includes a third policy, and the third policy indicates that a sidecar in the sidecar cluster is preferentially used when a quantity of objects served by the sidecar is 0. The selecting a first sidecar from the sidecar cluster according to the sidecar allocation policy, and forwarding, to the first sidecar, a data packet sent by the first service container group includes: The connection control module determines a quantity of objects served by the first sidecar, and forwards, to the first sidecar when the quantity of objects served by the first sidecar is 0, the data packet sent by the first service container group.

In some embodiments, the method further includes: The connection control module monitors a working status of each sidecar in the sidecar cluster, and when finding that there is an offline sidecar, sends information about the offline sidecar to the console.

In some embodiments, traffic management includes traffic control, traffic securing, and traffic observation.

According to the container group management method provided in this embodiment of this application, a sidecar may be selected for a service container group from at least two sidecars according to a sidecar allocation policy sent by a console, and the selected sidecar is used to perform traffic management on a data packet sent by the service container group, so that the service container group can be flexibly managed, and better traffic management can be performed on the service container group, thereby ensuring a high availability capability of a service of the service container group.

It should be noted that, in this embodiment of this application, the sidecar may alternatively perform traffic processing on a data packet that is sent from another service container group outside the node or in the node to the service container group bound to the sidecar. A traffic processing policy may also be set with reference to the foregoing manner. This is not limited in this embodiment of this application.

Refer to FIG. 8. An embodiment of this application further provides a node 800, including a processor 810 and a memory 820. The processor 810 is configured to execute instructions stored in the memory 820, so that the node 800 can perform the method shown in FIG. 7.

An embodiment of this application further provides a computer-readable storage medium, including computer program instructions. When the computer program instructions are executed by a computing device cluster, the computing device cluster performs the method shown in FIG. 7.

An embodiment of this application further provides a computer program product including instructions. When the instructions are run by a computing device cluster, the computing device cluster is enabled to perform the method shown in FIG. 7.

It may be understood that, the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any regular processor. It may be understood that various numbers in embodiments of this application are merely used for differentiation for ease of description, and are not used to limit the scope of embodiments of this application.

What is claimed is:

1. A method comprising:
receiving, by a node, a sidecar allocation policy sent by a console connected to the node;
selecting a first sidecar from a sidecar cluster according to the sidecar allocation policy, wherein the sidecar cluster executes on the node and comprises at least two sidecars;
forwarding, to the first sidecar, a data packet sent by a first service container group running on the node; and
performing, by the first sidecar, traffic management on the data packet sent by the first service container group.

2. The method according to claim 1, wherein a second service container group is further run on the node, and the method further comprises:
selecting, by a processor, a second sidecar from the sidecar cluster according to the sidecar allocation policy;
forwarding, to the second sidecar, a data packet sent by the second service container group; and
performing, by the second sidecar, traffic management on the data packet sent by the second service container group.

3. The method according to claim 2, wherein
a specification of a hardware resource allocated to the first sidecar is higher than that of a hardware resource allocated to the second sidecar;
the sidecar allocation policy comprises a first policy that indicates the first service container group to preferentially use the first sidecar; and
the selecting the first sidecar from the sidecar cluster according to the sidecar allocation policy comprises:
selecting the first sidecar from the sidecar cluster according to the first policy.

4. The method according to claim 2, wherein
the second service container group is further run on the node;
the sidecar allocation policy further comprises a second policy that indicates a quantity of objects served by the first sidecar does not exceed an upper limit value; and
the method further comprises:
determining, by the processor, the quantity of objects served by the first sidecar;
forwarding, to the first sidecar when the quantity does not exceed the upper limit value, the data packet sent by the second service container group; and
simultaneously performing, by the first sidecar, traffic management on the data packet sent by the first service container group and the data packet sent by the second service container group.

5. The method according to claim 1, wherein the method further comprises:

when the first sidecar is faulty, selecting, by a processor, a third sidecar from the sidecar cluster, or notifying the console to create the third sidecar in the node;

forwarding, to the third sidecar, another data packet sent by the first service container group; and performing, by the third sidecar, traffic management on the other data packet sent by the first service container group.

6. The method according to claim 5, wherein the third sidecar is a new version to which a function is upgraded based on the first sidecar, or the third sidecar is a replication version of the first sidecar.

7. The method according to claim 5, wherein the method further comprises:

sending, by the first sidecar, the data packet to a back-end container group after performing traffic management on the data packet sent by the first service container group.

8. The method according to claim 7, wherein the method further comprises:

generating, by the first sidecar, a session identifier;

sending the session identifier to the first service container group and the processor;

recording, by the processor, a correspondence between the session identifier and the back-end container group;

obtaining, by the third sidecar, the session identifier from the first service container group;

determining, based on the session identifier, the back-end container group in the correspondence recorded by the processor; and sending the other data packet to the back-end container group after performing traffic management on the other data packet sent by the first service container group.

9. The method according to claim 1, wherein the sidecar allocation policy comprises a third policy that indicates a sidecar in the sidecar cluster is preferentially used when a quantity of objects served by the sidecar is 0; and the selecting the first sidecar from the sidecar cluster according to the sidecar allocation policy, and forwarding, to the first sidecar, the data packet sent by the first service container group comprises:

determining a quantity of objects served by the first sidecar; and forwarding, to the first sidecar when the quantity of objects served by the first sidecar is 0, the data packet sent by the first service container group.

10. The method according to claim 1, wherein the method further comprises:

monitoring a working status of each sidecar in the sidecar cluster; and when determining that there is an offline sidecar, sending information about the offline sidecar to the console.

11. A node comprising:

a processor; and a memory to store instructions that, when executed by the processor, cause the processor to:

receive a sidecar allocation policy sent by a console connected to the node;

select a first sidecar from a sidecar cluster according to the sidecar allocation policy, wherein the sidecar cluster runs on the node and comprises at least two sidecars;

forward to the first sidecar, a data packet sent by a first service container group running on the node; and run the first sidecar to perform traffic management on the data packet sent by the first service container group.

12. The node according to claim 11, wherein a second service container group is further run on the node, and wherein the processor is further to:

select a second sidecar from the sidecar cluster according to the sidecar allocation policy;

forward to the second sidecar, a data packet sent by the second service container group; and run the second sidecar to perform traffic management on the data packet sent by the second service container group.

13. The node according to claim 12, wherein a specification of a hardware resource allocated to the first sidecar is higher than that of a hardware resource allocated to the second sidecar;

the sidecar allocation policy comprises a first policy that indicates the first service container group to preferentially use the first sidecar; and the processor is further to:

select the first sidecar from the sidecar cluster according to the first policy.

14. The node according to claim 12, wherein the second service container group is further run on the node;

the sidecar allocation policy further comprises a second policy that indicates a quantity of objects served by the first sidecar does not exceed an upper limit value; and the processor is further to:

determine the quantity of objects served by the first sidecar;

forward to the first sidecar when the quantity does not exceed the upper limit value, the data packet sent by the second service container group; and run the first sidecar to perform simultaneously traffic management on the data packet sent by the first service container group and the data packet sent by the second service container group.

15. The node according to claim 11, wherein the processor is further to:

when the first sidecar is faulty, select a third sidecar from the sidecar cluster, or notifying the console to create the third sidecar in the node;

forwarding, to the third sidecar, another data packet sent by the first service container group; and run the third sidecar to perform traffic management on the other data packet sent by the first service container group.

16. The node according to claim 15, wherein the third sidecar is a new version to which a function is upgraded based on the first sidecar, or the third sidecar is a replication version of the first sidecar.

17. The node according to claim 15, wherein:

run the first sidecar to send the data packet to a back-end container group after performing traffic management on the data packet sent by the first service container group.

18. The node according to claim 17, wherein the processor is further to:

run the first sidecar to generate a session identifier;

send the session identifier to the first service container group and the node;

record a correspondence between the session identifier and the back-end container group;

run the third sidecar to obtain the session identifier from the first service container group;

determine, based on the session identifier, the back-end container group in the correspondence recorded by a connection control module; and send the other data packet to the back-end container group after performing traffic management on the other data packet sent by the first service container group.

19. The node according to claim 11, wherein the sidecar allocation policy comprises a third policy that indicates a sidecar in the sidecar cluster is preferentially used when a quantity of objects served by the sidecar is 0; and the processor is further to:

determine a quantity of objects served by the first sidecar; and forward, to the first sidecar when the quantity of objects served by the first sidecar is 0, the data packet sent by the first service container group.

20. The node according to claim 11, wherein the processor is further to:

monitor a working status of each sidecar in the sidecar cluster; and when determining that there is an offline sidecar, send information about the offline sidecar to the console.

\* \* \* \* \*